United States Patent
Soubra et al.

(10) Patent No.: US 9,134,127 B2
(45) Date of Patent: Sep. 15, 2015

(54) DETERMINING TILT ANGLE AND TILT DIRECTION USING IMAGE PROCESSING

(71) Applicant: Trimble Navigation Limited, Sunnyvale, CA (US)

(72) Inventors: Omar Pierre Soubra, Westminster, CO (US); James M. Janky, Los Altos, CA (US); Christian Graesser, Vallentuna (SE); Shawn D. Weisenburger, Denver, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 14/172,549

(22) Filed: Feb. 4, 2014

(65) Prior Publication Data
US 2014/0156219 A1 Jun. 5, 2014

Related U.S. Application Data

(63) Continuation-in-part of application No. 13/397,445, filed on Feb. 15, 2012, which is a continuation-in-part of application No. 13/167,733, filed on Jun. 24, 2011, now Pat. No. 8,754,805.

(51) Int. Cl.
G01C 9/00 (2006.01)
G01C 15/00 (2006.01)
(Continued)

(52) U.S. Cl.
CPC ........ *G01C 15/00* (2013.01); *G01C 9/06* (2013.01); *G01C 15/06* (2013.01); *G01S 1/725* (2013.01);
(Continued)

(58) Field of Classification Search
CPC ........ G01C 15/06; G01C 15/00; G01C 21/12; G01C 9/06; G01S 19/48; G01S 19/51; G01S 19/53; G01S 1/725; G06K 9/00664; G06T 2207/30204; G06T 2207/30244; G06T 7/0042
See application file for complete search history.

(56) References Cited

U.S. PATENT DOCUMENTS 5,642,285 A 6/1997 Woo
6,147,598 A 11/2000 Murphy
(Continued)

FOREIGN PATENT DOCUMENTS

EP 1931945 6/2008
EP 1936323 A2 6/2008
(Continued)

OTHER PUBLICATIONS

Non-Final Office Action of Dec. 5, 2014 for U.S. Appl. No. 13/397,445, 14 pages.
(Continued)

*Primary Examiner* — Elias Desta
(74) *Attorney, Agent, or Firm* — Kilpatrick Townsend & Stockton LLP

(57) ABSTRACT

A method of determining a tilt angle and a tilt direction of a survey instrument. The survey instrument has an imaging device that captures first images at a first location. The first images include features from an environment around the survey instrument. The imaging device also captures second images at a second location. The second images include a portion of the features. A pose of the imaging device is determined at the second location using observed changes in location of a common portion of the features between the first images and the second images. The tilt angle and the tilt direction of the survey instrument at the second location are determined using the pose of the imaging device.

27 Claims, 25 Drawing Sheets

(51) Int. Cl.
*G01C 15/06* (2006.01)
*G01S 19/48* (2010.01)
*G01S 19/51* (2010.01)
*G01S 19/53* (2010.01)
*G01S 1/72* (2006.01)
*G06K 9/00* (2006.01)
*G06T 7/00* (2006.01)
*G01C 9/06* (2006.01)

(52) U.S. Cl.
CPC ............... *G01S 19/48* (2013.01); *G01S 19/51* (2013.01); *G01S 19/53* (2013.01); *G06K 9/00664* (2013.01); *G06T 7/0042* (2013.01); *G06T 2207/30204* (2013.01); *G06T 2207/30244* (2013.01)

(56) References Cited

U.S. PATENT DOCUMENTS

| | | | |
|---|---|---|---|
| 6,282,362 | B1 | 8/2001 | Murphy |
| 7,248,285 | B2 | 7/2007 | Needham |
| 7,339,611 | B2 | 3/2008 | Marold |
| 7,526,384 | B2 | 4/2009 | MacIntosh et al. |
| 7,541,974 | B2 | 6/2009 | Scherzinger |
| 7,619,561 | B2 | 11/2009 | Scherzinger |
| 7,650,013 | B2 | 1/2010 | Dietsch et al. |
| 7,697,127 | B2 | 4/2010 | Vogel |
| 7,719,467 | B2 | 5/2010 | Norda |
| 7,991,575 | B2 | 8/2011 | Vogel et al. |
| 8,031,933 | B2 * | 10/2011 | Se et al. .................. 382/154 |
| 8,351,686 | B2 | 1/2013 | Graesser |
| 2003/0083804 | A1 | 5/2003 | Pilley et al. |
| 2004/0168148 | A1 | 8/2004 | Goncalves et al. |
| 2005/0125142 | A1 | 6/2005 | Yamane |
| 2005/0209815 | A1 | 9/2005 | Russon et al. |
| 2006/0125691 | A1 | 6/2006 | Menache et al. |
| 2008/0285805 | A1 | 11/2008 | Luinge et al. |
| 2009/0024325 | A1 | 1/2009 | Scherzinger |
| 2009/0093959 | A1 | 4/2009 | Scherzinger et al. |
| 2009/0262974 | A1 | 10/2009 | Lithopoulos |
| 2010/0063733 | A1 | 3/2010 | Yunck |
| 2010/0141759 | A1 | 6/2010 | Scherzinger |
| 2010/0172546 | A1 | 7/2010 | Sharp |
| 2010/0174507 | A1 | 7/2010 | Vogel |
| 2011/0007939 | A1 | 1/2011 | Teng et al. |
| 2012/0163656 | A1 | 6/2012 | Wang et al. |
| 2012/0166137 | A1 | 6/2012 | Grasser et al. |
| 2012/0330601 | A1 | 12/2012 | Soubra et al. |
| 2014/0267700 | A1 | 9/2014 | Wang et al. |

FOREIGN PATENT DOCUMENTS

| | | |
|---|---|---|
| EP | 1944572 A1 | 7/2008 |
| EP | 2240740 | 10/2010 |
| WO | 2009/100773 A1 | 8/2009 |
| WO | 2009/100774 A1 | 8/2009 |
| WO | 2009/103342 A1 | 8/2009 |
| WO | 2009/106141 A1 | 9/2009 |
| WO | 2010/080950 A1 | 7/2010 |
| WO | 2014/055428 A2 | 4/2014 |
| WO | 2014/055430 A2 | 4/2014 |

OTHER PUBLICATIONS

Chapman et al.,"Monocular SLAM—Alternative Navigation for GPS-Denied Areas," GPS World; Sep. 2008, pp. 42-49.

Kohler et al., "TrackSense: Infrastructure Free Precise Indoor Positioning Using Projected Patterns," A. LaMarca et al. (Eds.) Pervasive 2007, LNCS 4480, pp. 334-350, Springer-Verlag Berlin Heiderlberg.

Lemaire et al., "Vision-Based SLAM: Stereo and Monocular Approaches," International Journal of Computer Vision 74 (3), pp. 343-364, Springer Science + Business Media, LLC (2007).

Joao Carlos Aparicio Fernandes et al., "Using Conical and Spherical Mirrors with Conventional Cameras for 360° Panorama Views in a Single Image" ICM 2006 3rd International Conference on Mechatronics, 4 pages.

Daniel G. Aliaga, "Omnidirectional Camera Models" CS535 Fall 2010, Department of Computer Science, Purdue University, 31 pages.

DIY 360 Degree Omnidirectional Camera retrieved from http://dasl.mem.drexel.edu/Hing/tutorials/omnicam/homebrew_omnicam.htm Jul. 24, 2012, 7 pages.

Yasushi Yagi, "Omnidirectional Sensing and Its Applications" IECe Trans. Inf. & Syst., vol. E82-D, No. 3 Mar. 1999, 12 pages.

U.S. Appl. No. 13/954,995, Shawn D. Weisenburger, "Sequential Rolling Bundle Adjustment", filed Jul. 31, 2013, 73 pages (unpublished).

Non-Final Office Action of Oct. 8, 2013 for U.S. Appl. No. 13/167,733, 15 pages.

Notice of Allowance of Feb. 6, 2014 for U.S. Appl. No. 13/167,733, 6 pages.

\* cited by examiner

CAHV Reference Frame
(H extends along horizontal axis;
V extends downward along vertical axis;
and A extends inward along lens axis)

X'Y'Z' Reference Frame
(X'Y' lie along image plane and
Z' extends outward along lens axis)

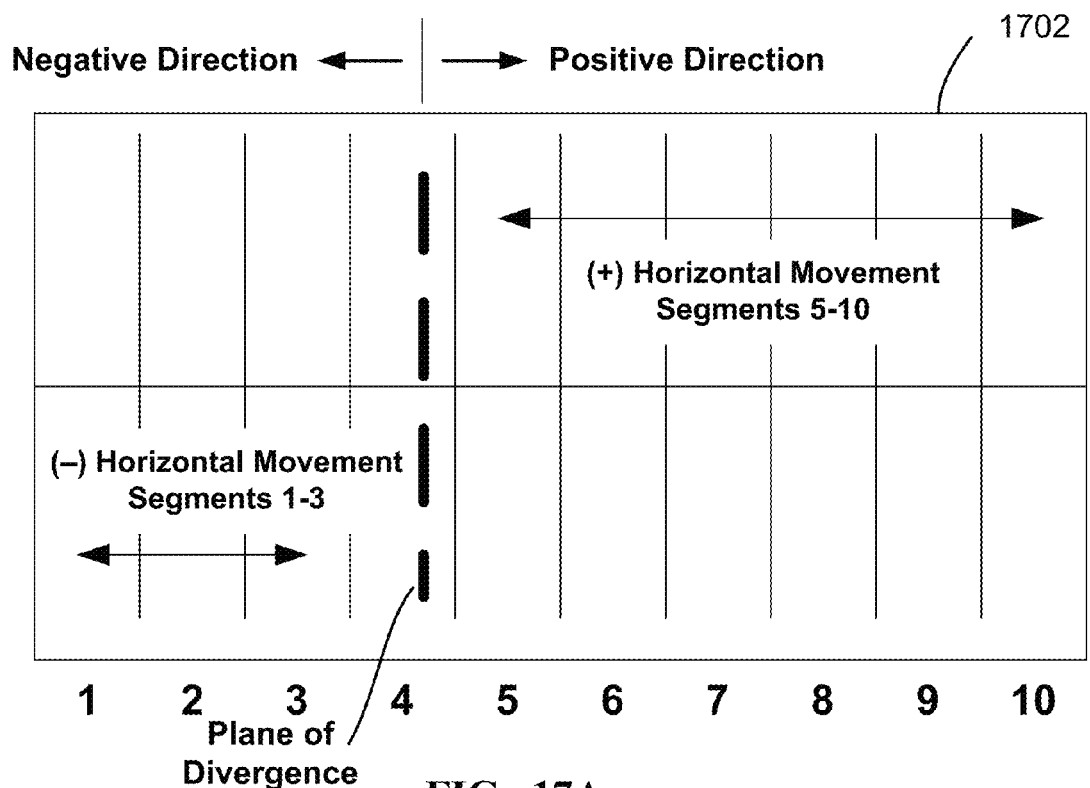
FIG. 17A
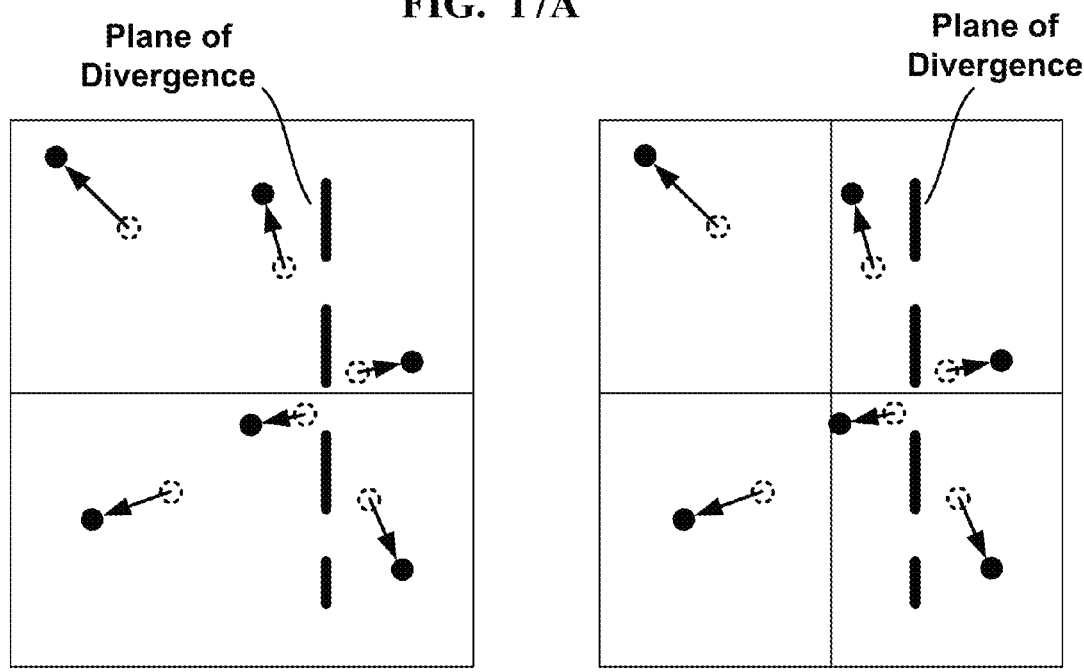
FIG. 17B
FIG. 17C

DETERMINING TILT ANGLE AND TILT DIRECTION USING IMAGE PROCESSING

CROSS-REFERENCES TO RELATED APPLICATIONS

The present application is a continuation-in-part of U.S. patent application Ser. No. 13/397,445, filed Feb. 15, 2012, which is a continuation-in-part of U.S. patent application Ser. No. 13/167,733, filed Jun. 24, 2011, now U.S. Pat. No. 8,754,805, the disclosures of which are incorporated herein by reference in their entirety for all purposes.

FIELD OF THE INVENTION

Embodiments of the present invention relate generally to methods and instruments for determining tilt angle and tilt direction using image processing techniques. The methods and instruments may be used in survey applications such as determining locations of points.

BACKGROUND

Controlling tilt of a survey instrument is a major activity for a surveyor. A great deal of time and effort is devoted to insuring that a survey instrument is leveled. Conventional methods of leveling a survey instrument involve aligning the survey instrument with a local gravity vector using a bubble level. Typical survey procedures involve leveling a survey instrument before performing measurements so that data is nearly free of tilt errors.

Today's survey instruments often comprise an optical system and a Global Navigation Satellite System (GNSS), otherwise referred to a Global Positioning System (GPS). A conventional GNSS survey instrument typically includes a location measurement device coupled to an end of a surveyor's pole, whereas a conventional optical survey instrument (e.g., optical total station) typically uses a tripod support system. The GNSS type of survey instrument is used to determine locations of points of interest that are typically located on the ground when many data points are desired, owing to its ease of portability. A bottom or tip of the surveyor's pole is placed at the point of interest, the survey instrument is held in a vertical position (or orientation) as indicated by the bubble level, and a location measurement is obtained. Leveling ensures that a measurement center (e.g., the antenna phase center) of the location measurement device is as close to directly above the point of interest as possible. This is important because error is introduced if the measurement center is not directly above the point of interest. For example, a surveyor's pole that is two-meters long and is tilted two degrees from vertical can result in several centimeters of measurement error. That is, the measurement center of the location measurement device may be as much as two centimeters to one side of the point of interest.

If the time required to level a survey instrument could be reduced or eliminated, a surveyor could be more productive by taking more measurements during a given time period. Thus, improved methods and instruments are continually desired to reduce the time and effort required to level a survey instrument. This applies to GNSS survey instruments, optical survey instruments, handheld survey instruments, and any other type of survey instrument that utilizes leveling processes.

SUMMARY

Embodiments of the present invention provide improved methods and instruments for determining tilt angle and tilt direction of a survey instrument using image processing techniques. The tilt angle and tilt direction may be used in survey applications to determine locations of points. For example, in some embodiments a pose of an imaging device that is coupled to a surveying instrument is determined using match-move image processing techniques. As used herein, match-move refers broadly to software applications that can be used to extract information (such as camera pose) from one or more images. The pose of the imaging device can be used to determine the tilt angle and tilt direction of the survey instrument. Further, the survey instrument may include a location measurement device, and a measured location may be used with the tilt angle and tilt direction to determine a location of a point of interest (e.g., a point at a tip of a surveyor's pole, a point identified using a laser pointer of a handheld survey instrument, or the like).

In some embodiments, a survey instrument may include an image capture system that includes a plurality of cameras. A pose of the image capture system may be determined using images from one or more of the cameras. For example, in accordance with an embodiment, a method of determining a tilt angle and a tilt direction of a survey instrument includes capturing images at different locations. At a first location, first images are captured that include features from an environment around the survey instrument. At a second location, second images are captured that include a portion of the first features. A pose of the imaging device at the second location is determined using observed changes in location of the portion of the first features between the first images and the second images. Determining the pose includes assigning a weighting factor to each of the second images. The weighting factor is associated with a relative contribution of each of the second images in determining the pose of the imaging device. The tilt angle and the tilt direction of the survey instrument at the second location are determined using the pose of the imaging device.

In other embodiments that include an image capture system with a plurality of cameras, a pose may be calculated based on an average of the poses determined using images from each of the cameras.

In yet other embodiments, a survey instrument may include an image capture system that includes one or more wide angle lenses that can provide images that include up to a full 360° view of the surrounding environment. For example, in accordance with an embodiment a method of determining a tilt angle and a tilt direction of a survey instrument includes capturing images at different locations. At a first location, a first panoramic image is captured that includes first features from the environment around the survey instrument. At a second location, a second panoramic image is captured that includes a portion of the first features. A pose of the imaging device at the second location is determined using observed changes in location of the portion of the first features between the first panoramic image and the second panoramic image. The tilt angle and the tilt direction of the survey instrument at the second location are determined using the pose of the imaging device.

Numerous benefits are achieved using embodiments of the present invention over conventional techniques. For example, some embodiments provide methods for determining a tilt angle and tilt direction of a survey instrument using a pose of an imaging device. Since pose can be determined, survey measurements can be performed using an un-leveled survey instrument. Performing measurements using an un-leveled survey instrument can increase measurement efficiency by reducing the time and effort that is normally required to level the survey instrument. The increased efficiency can reduce measurement time and lower measurements costs. Depending on the embodiment, one or more of these benefits may exist. These and other benefits are described throughout the specification and more particularly below.

BRIEF DESCRIPTION OF THE DRAWINGS

FIGS. 1A-1C are simplified diagrams illustrating a method of determining a pose of an imaging device that may be used to determine a tilt angle and tilt direction of a survey instrument in accordance with an embodiment of the invention;

FIGS. 17A-17C are simplified diagrams illustrating a method of identifying a vertical plane of divergence in accordance with an embodiment;

DETAILED DESCRIPTION

Embodiments of the present invention provide improved methods and instruments for determining tilt angle and tilt direction using image processing techniques. As used herein, tilt angle refers to an angle between a real-world vertical axis (e.g., a local gravity vector) and a vertical axis of an imaging device. Tilt direction refers to orientation (or angle of rotation about the vertical axis) relative to a reference such as true north, magnetic north, or any other reference. The image processing techniques may involve using one or more matchmove techniques to determine a pose of an imaging device. The pose may include a location and/or rotation of the imaging device relative to a reference. In some embodiments, the reference is provided by features in an image where the features are at known locations in a reference frame. In other embodiments, the reference is provided by observed changes between common features in images where at least one of the images is acquired with the imaging device in a known (e.g., leveled) position. The pose of the imaging device can be used to determine a tilt angle and tilt direction of the survey instrument to which the imaging device is coupled. The tilt angle and tilt direction can be used with a measured location of a survey instrument to determine a location of a point of interest. As an example, in some embodiments the survey instrument may include a support pole (e.g., a surveyor's pole), and the tilt angle and tilt direction may be used to determine the location of a point at a tip of the support pole.

As used herein, pose refers to exterior (or extrinsic) orientation of an imaging device. This is the orientation of the imaging device with respect to surrounding objects in a field of view. The orientation is generally defined by a rotation matrix R and/or a translation vector V that relate a coordinate system of the imaging device with a real-world coordinate system. The process of determining pose may be referred to as extrinsic calibration. This is in contrast to intrinsic calibration, that may be used to determine internal parameters such as focal length, image aspect ratio, effective number of pixels, principal point, and the like.

Determining Pose Using Features at Known Locations

Figure 1B:
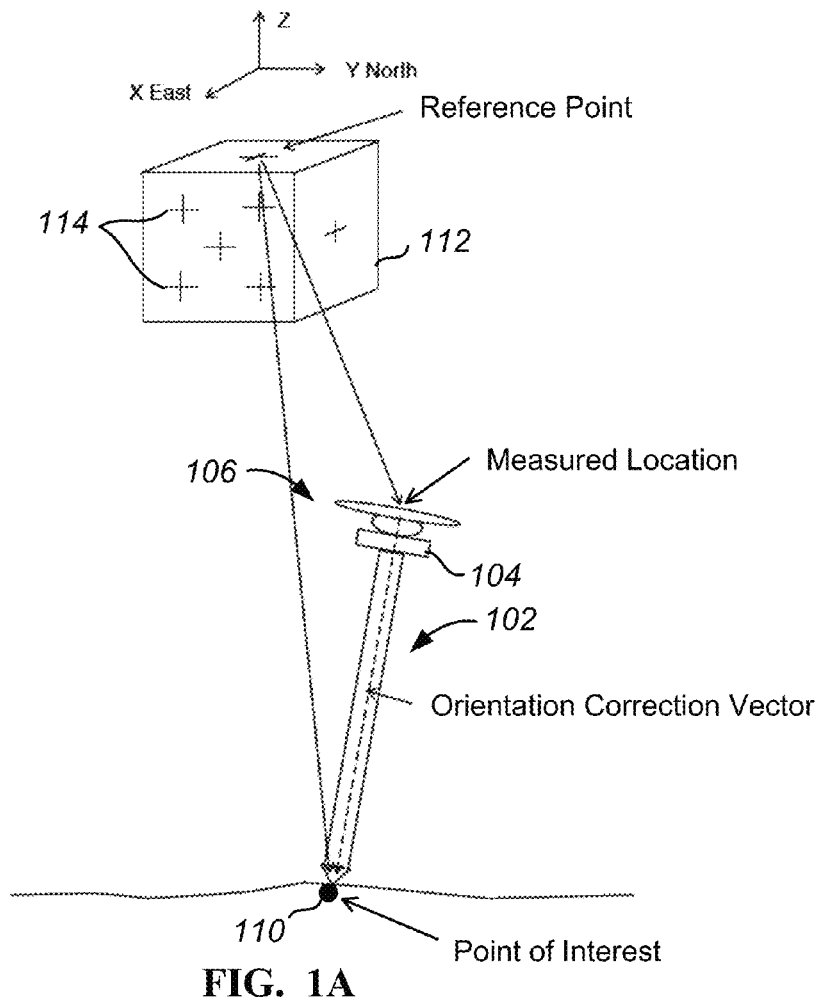
Figure 1B:
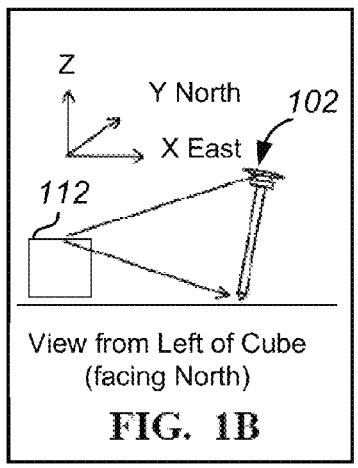
Figure 1C:
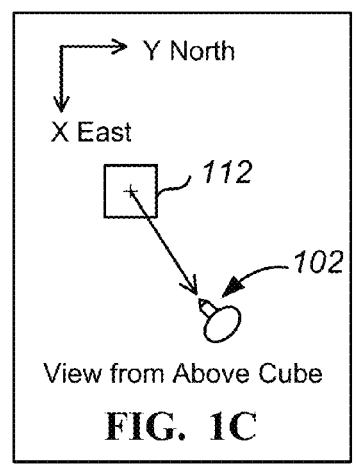

FIGS. 1A-1C are simplified diagrams illustrating a method of determining a pose of an imaging device. The pose may be used to determine tilt angle and tilt direction of a survey instrument in accordance with an embodiment of the invention. In this example, the pose is determined using features in an image where the features (i.e., reference points 114 on cube 112) are at known locations in a reference frame such as a real-world coordinate system.

FIG. 1A shows a survey instrument 102 positioned at a point of interest 110. The survey instrument 102 includes a location measurement device such as a global navigation satellite system (GNSS) receiver 106 and an imaging device such as a camera 104 (e.g., a digital camera, a digital video camera, or the like). It should be appreciated that virtually any type of location measurement device or imaging device may be used in accordance with embodiments of the invention. For example the imaging device may comprise multiple cameras configured to obtain images that may include a panoramic view of a surrounding scene, cameras configured to obtain images that may include either distinct or overlapping views, or a single camera.

FIG. 1A also shows a cube 112 with reference points 114 on sides of the cube 112. The reference points 114 are at known locations in a reference frame and provide features for determining the pose of the camera 104. The reference points 114 may be referred to as control points. It should be appreciated that any point, line, region, or the like may be used as a reference point and that it is not necessary that the reference points 114 are located on the same object. For example, the reference points 114 may be located on one or more existing structures visible in a field of view of the camera 104. Also, any particular object may be used such as a horizontal bar or rod. The cube 112 and the reference points 114 are used merely as an example. Also, while any reference frame may be used with embodiments of the invention, the reference frame in this example is a real-world coordinate system that includes a Y-axis extending north-south (+ is north and − is south), an X-axis extending east-west (+ is east and − is west), and a Z-axis that is coaxial with a local gravity vector.

FIGS. 1B-1C show that the survey instrument 102 in this example is un-leveled with respect to the reference frame. FIG. 1B is a side-view showing that the survey instrument 102 is tilted away from the cube 112 in an easterly direction, and FIG. 1C is a top-view showing that the survey instrument 102 is tilted away from the cube 112 in a north-easterly direction.

The pose of the camera 104 in this example can be determined using image information obtained using the camera 104 and the locations of the reference points 114 in the reference frame. The image information is obtained by capturing one or more images of the cube 112 that include the reference points 114. The locations of the reference points 114 may be determined using the survey instrument 102 and conventional survey measurements (e.g., by measuring the locations of the reference points 114). Alternatively, the locations of the reference points 114 may be provided (e.g., determined previously). The locations include coordinates of one or more of the reference points 114 in the reference frame (or in any other reference frame with a known relationship so that coordinates can be transformed into a common reference frame).

Rather than providing the locations of all of the reference points 114, information about alignment of the cube 112 in the reference frame may be known along with a spatial relationship between the reference points 114. For example, the cube 112 may be aligned 'right and regular' with a local gravity vector and distances between the reference points 114 (e.g., in x, y, z coordinates) provided. In this case, the location of only one of the reference points 114 is needed to determine the locations of the other reference points 114.

Figure 2:
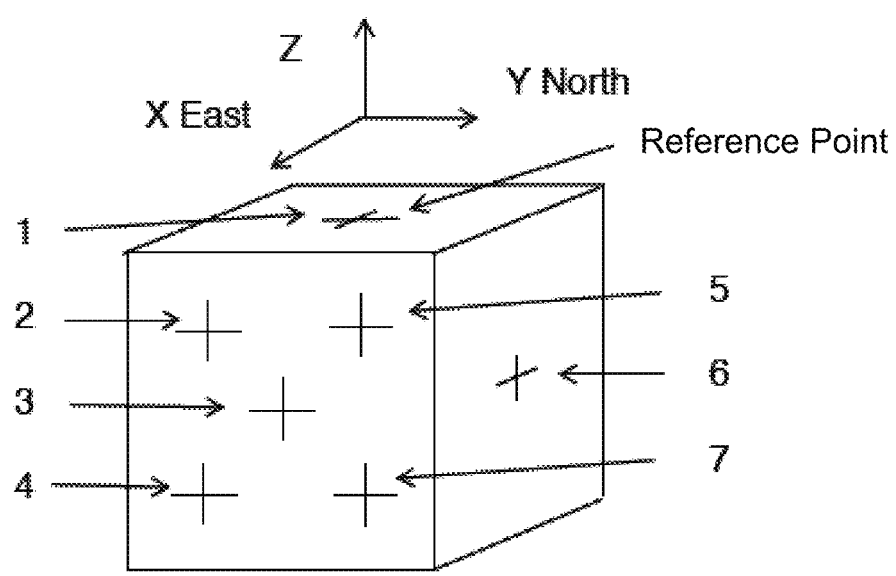
FIG. 2 is a simplified diagram of an object that may be used to determine a pose of an imaging device in accordance with an embodiment of the invention.

FIG. 2 provides an example of a cube that is aligned with the same reference frame that is used in FIGS. 1A-1C and has a reference point on a top surface that is at a known location in the reference frame. If the reference point is assumed to have coordinates (0, 0, 0), TABLE 1 below provides a spatial relationship (and coordinates in this example) between the reference point and each of the other points. Units are in meters in this example and the cube is one meter on a side for ease of explanation. It should be appreciated that objects of any size or shape may be used with embodiments of the invention.

TABLE 1

| Ref. Pt. No. | Spatial Relationship (Coordinates) |
| --- | --- |
| 1 | (0, 0, 0) |
| 2 | (0.5, −0.25, −0.25) |
| 3 | (0.5, 0, −0.5) |
| 4 | (0.5, −0.25, −0.75) |
| 5 | (0.5, +0.25, −0.25) |
| 6 | (0, +0.5, −0.5) |
| 7 | (0.5, +0.25, −0.75) |

Using the image information and the locations of the reference points 114, the pose of the camera 104 can be determined using known matchmove techniques. In this embodiment, the matchmove techniques utilize feature-identification processes to identify the reference points 114 in the one or more images obtained using the camera 104. The cube 112 may include a survey reflector with a target to improve the feature-identification processes. The pose of the camera 104 relative to the reference points 114 is determined based on the locations of the reference points 114 in the one or more images and the known locations of the reference points 114 in the reference frame. Most matchmove techniques can determine the pose of the camera 104 from a single image that includes at least four of the reference points 114 that are non-collinear.

Examples of matchmove software applications that may be used with some embodiments include Voodoo Camera Tracker by Digilab, 3D-Equalizer by Science.D.Visions, Boujou by 2d3, MatchMover by Autodesk, PFTrack by The Pixel Farm, SynthEyes by Andersson Technologies, and VooCAT by Scenespector Systems.

Following is a list of references that provide additional details on various matchmove techniques. Each of these references are incorporated herein by reference in their entirety.

C. Wöhler, "3D Computer Vision: Efficient Methods and Applications," Guildford: Springer London, 2009.

F-E Ababsa, M. Mallem, "Robust camera pose estimation using 2d fiducials tracking for real-time augmented reality systems," Association for Computing Machinery (ACM), 2004.

F. Shi, X. Zhang, Y. Liu, "A new method of camera pose estimation using 2D-3D corner correspondence," Pattern Recognition Letters, 2004.

G. Simon, A. Fitzgibbon, and A. Zisserman, "Markerless tracking using planar structures in the scene," International Symposium on Augmented Reality (ISAR), 2000.

J. M. Frahm, K. Koser, and R. Koch, "Pose Estimation for Multi-Camera Systems," Deutsche Arbeitsgemeinschaft für Mustererkennung (DAGM), 2004.

J-S Park and B-J Lee, "Vision-based real-time camera match moving using a known marker," Optical Engineering (February 2006).

M-A Ameller, B. Triggs, and L. Quan, "Camera Pose Revisited: New Linear Algorithms," European Conference on Computer Vision (ECCV), 2000.

Some of the matchmove techniques referenced above can determine pose of the camera 104 in real-time, while others post-process data stored in memory. While accuracy varies depending on the specific technique, many techniques report sub-pixel accuracy.

Determining Pose Using Observed Changes Between Common Features in Images

Figure 3A:
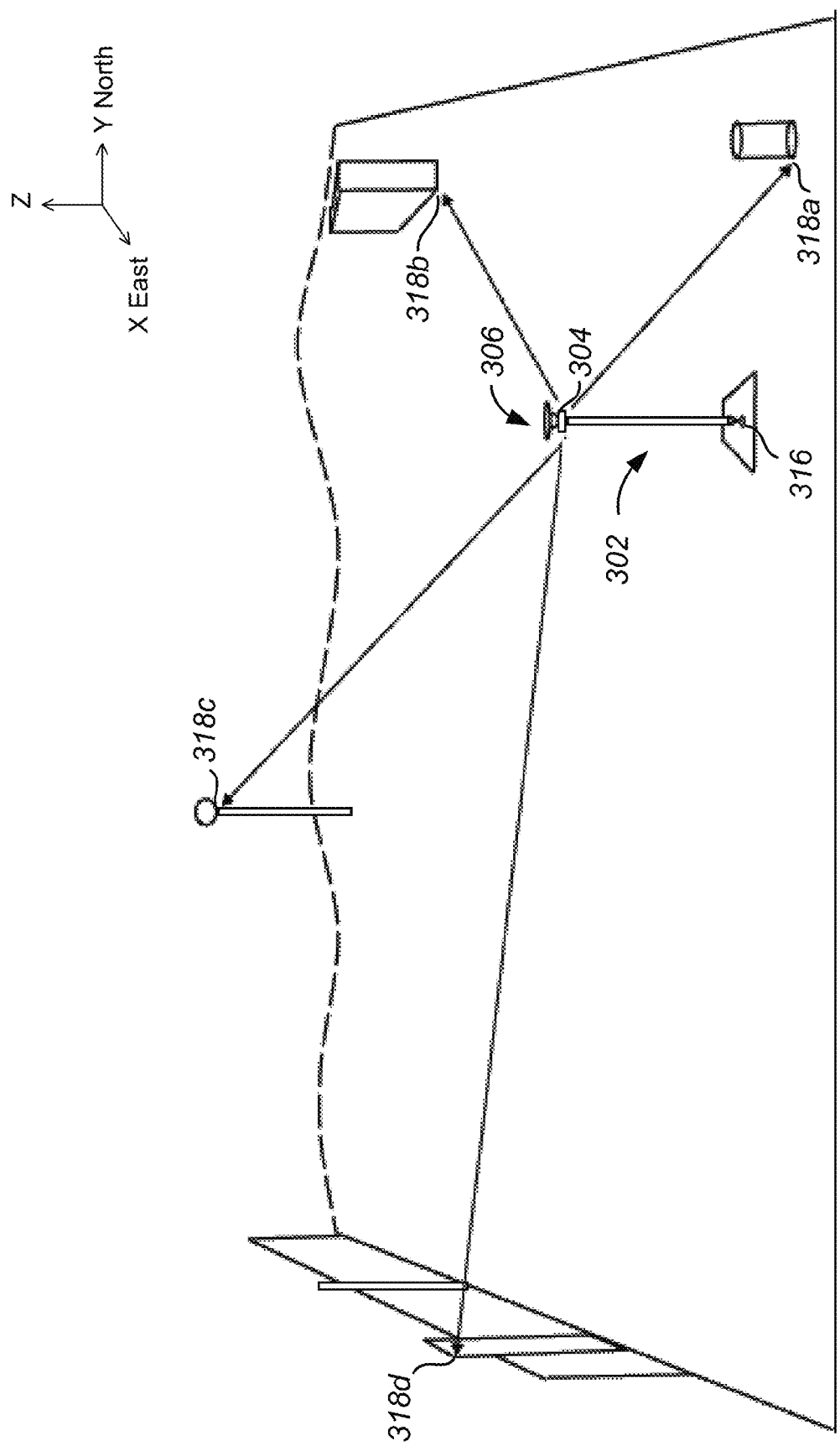
FIGS. 3A-3B are simplified diagrams illustrating a method of determining a pose of an imaging device that may be used to determine a tilt angle and tilt direction of a survey instrument in accordance with another embodiment of the invention.
Figure 3B:
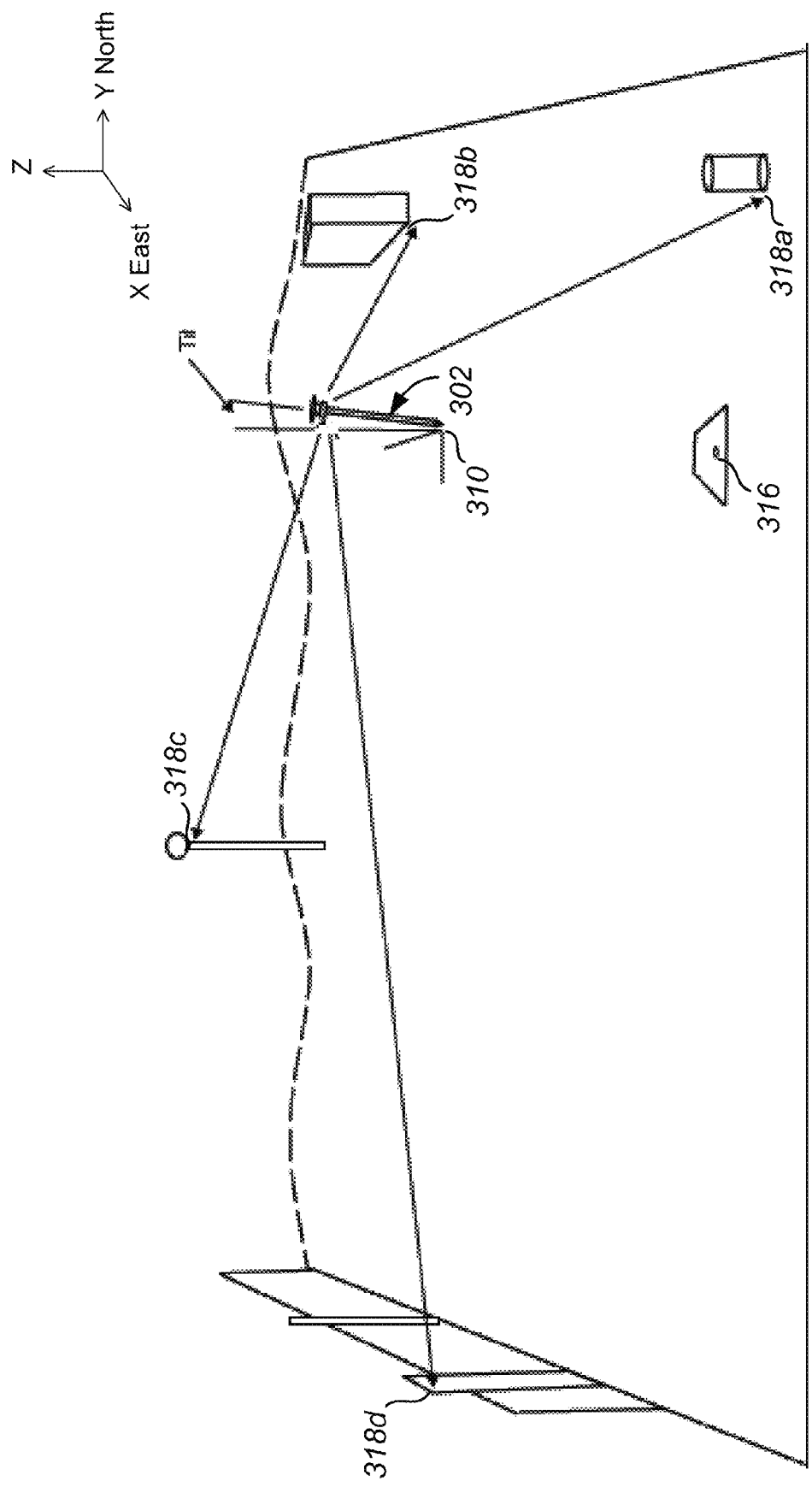

FIGS. 3A-3B are simplified diagrams illustrating a method of determining a pose of an imaging device. The pose may be used to determine tilt angle and tilt direction of a survey instrument in accordance with another embodiment of the invention. In this example, the pose is determined using observed changes between common features in images where at least one of the images is acquired with the imaging device in a known (e.g., leveled) position. The image acquired with the imaging device in a known position serves as a reference against which changes in pose in other images can be determined.

FIG. 3A shows a survey instrument 302 positioned at an initial point 316. Like the survey instrument 102 shown in FIG. 1, the survey instrument 302 includes a location measurement device such as a GNSS receiver 306 and an imaging device such as a camera 304. FIG. 3A also shows several features 318a, 318b, 318c, 318d surrounding the survey instrument 302 that may be in a field of view of the camera

304. It should be appreciated that the features 318*a*, 318*b*, 318*c*, 318*d* may include points, lines, regions, contours, surfaces, areas of texture, and the like that can be detected in an image using known feature-identification processes. While only four such features are identified, the figure likely includes many hundreds of features that could be identified using feature-identification processes.

In this example it is not necessary that the features 318*a*, 318*b*, 318*c*, 318*d* be at known locations in a reference frame to determine the pose of the camera 304. Instead, in this example the survey instrument 302 is in a leveled position. The survey instrument 302 may be leveled according to known methods that may involve use of a bubble level indicating when the survey instrument is level to within an accuracy of the bubble level. In a leveled position, an image is captured using the camera 304. The image includes some of the features 318*a*, 318*b*, 318*c*, 318*d* surrounding the survey instrument 302. These features will serve as a reference against which at least a portion of the same features in another image can be compared and a change in pose determined.

Leveled in this example refers to alignment with a reference (e.g., vertical alignment with a local gravity vector). While any reference frame may be used with embodiments of the invention, the reference frame in this example is a real-world coordinate system like that of FIG. 1 that includes a Y-axis extending north-south (+ is north and − is south), an X-axis extending east-west (+ is east and − is west), and a Z-axis that is coaxial with a local gravity vector.

FIG. 3B shows the survey instrument 302 at a different location than that shown in FIG. 3A. The survey instrument 302 is at a point of interest 310. This figure also shows that the survey instrument 302 is un-level with respect to the reference frame. The survey instrument 302 has an unknown tilt angle in what appears to be a northerly direction. Similar to FIG. 3A, an image is captured that includes at least some of the same features 318*a*, 318*b*, 318*c*, 318*d* surrounding the survey instrument 302.

Using the image obtained with the survey instrument 302 at the initial location 316 and the image obtained with the survey instrument 302 at the point of interest 310, the pose of the camera at the point of interest 310 can be determined using known matchmove techniques. In this embodiment, the matchmove techniques utilize correspondences between the images (or observed changes between common features in the images). The pose is determined with reference to the pose at the initial location 316 in a leveled position.

The pose of the camera is determined based on the locations of the features 318*a*, 318*b*, 318*c*, 318*d* in the image acquired with the survey instrument 302 in a known position (leveled) and the locations of the features 318*a*, 318*b*, 318*c*, 318*d* in the image acquired with the survey instrument 302 in a unknown position (un-leveled).

Figure 4A:
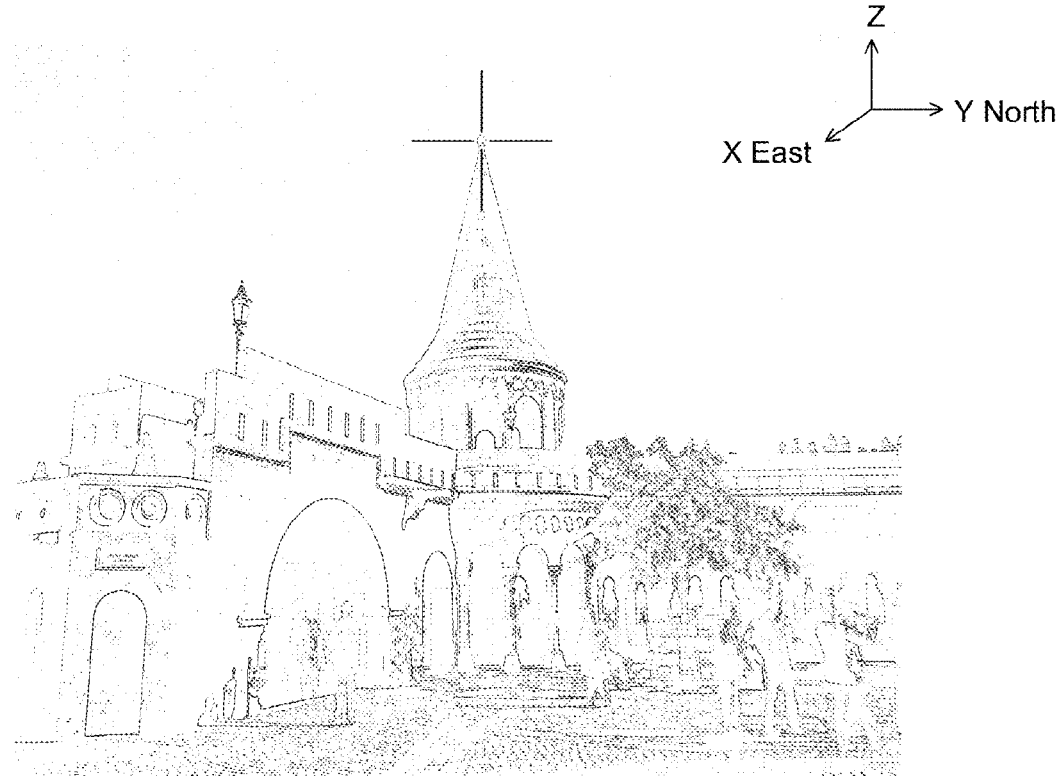
FIGS. 4A-4B are simplified diagrams illustrating a change in pose of an imaging device between a first image and a second image.
Figure 4B:
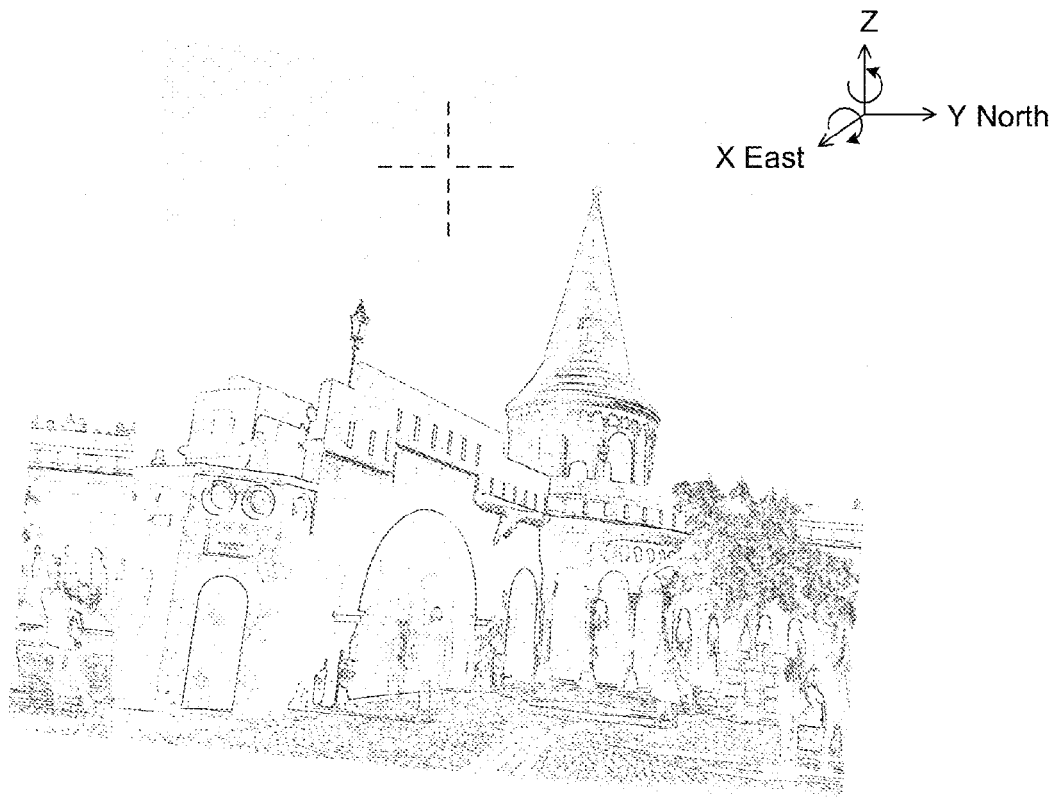

Locations of the features 318*a*, 318*b*, 318*c*, 318*d* will be different in the two images. This is illustrated from a camera point of view in FIGS. 4A-4B. FIG. 4A shows an image of a building with a camera at an initial pose (assume leveled). FIG. 4B shows an image of the building with the camera at a slightly different pose (assume un-leveled). The crosshairs identify approximately the same image location and aid in illustrating rotation of the camera between the images. The camera has been rotated counter-clockwise about X and Z axes between the images. Changes in pose between images can be determined when the camera is rotated as shown in FIGS. 4A-4B or when the camera is moved to a new location (and rotation) as shown in FIGS. 3A-3B.

Most of the same matchmove software applications and references listed above can also be used to determine pose using observed changes between common features in images. Additional details on matchmove techniques can be found in U.S. patent application Ser. No. 13/167,733, filed Jun. 24, 2011, and Ser. No. 13/954,995, filed Jul. 31, 2013; U.S. Patent Publication Nos. 2012/0330601, filed Feb. 15, 2012, and 2012/0163656, filed Jun. 24, 2011; and U.S. Pat. No. 8,229,166, issued Jul. 24, 2012, each of which is incorporated herein by reference in its entirety. The matchmove techniques described in these references utilize feature tracking, sequential bundle adjustment, simultaneous localization and mapping (SLAM), and/or other techniques. Some of these techniques may be used to provide real-time processing of image information.

Most matchmove techniques are typically configured to identify and track features in images. These features often include arbitrary points located at arbitrary locations. Often many hundreds of such features can be identified and tracked between images. Many matchmove techniques can use planar structures (e.g., the ground or building facades), surfaces, edges, corners of objects, and the like to determine pose based on observed changes between just one or two of such features. Some matchmove techniques automatically detect features in images, analyze correspondences, eliminate outliers, and incrementally estimate and refine camera parameters. Matchmove software applications often utilize a menu format and may provide location and orientation information using menus such as 'View→Camera Parameters' or the like.

In some embodiments, image information can be processed real-time to determine a pose of an imaging device (or to determine a pose of an imaging device real-time). As an example, the real-time processing can be performed using matchmove techniques such as the sequential bundle adjustment techniques described in U.S. patent application Ser. No. 13/954,995, filed Jul. 31, 2013, and incorporated herein by reference above. A sequential bundle adjustment technique may include obtaining a preceding set of images using the imaging device. A previous pose of the imaging device may be estimated using image information from at least one image of the preceding set of images. A current pose of the imaging device may be determined by replacing image information from at least one image of the preceding set of images with image information from one or more subsequent images obtained using the imaging device.

It should be appreciated that while only two images are used in the examples shown in FIGS. 3A-3B and 4A-4B, changes in pose between any number of images can be determined as long as a sufficient number of common features can be identified. Also, the same common features are not required between every image in a series as long as each image has a sufficient number of observed features that are common with another image so that changes in pose can be linked back to the reference image.

The number of common features required between any two images depends on the particular matchmove technique. In an embodiment, the number of common features required may be used to implement a warning signal (e.g., visual and/or audible cue) should the number of observed features approach or drop below a required threshold. For example, if more than half of the initial reference points are lost after moving from an initial point of interest to a new point of interest, an indication may be provided to a user via audible or visual signaling on a data collector or controller. Upon receiving such a warning, an orientation of the survey instrument may be adjusted to capture an image with more features that are common with other images. Alternatively, the survey instrument may be re-leveled and a new reference established. In other embodiments, other indications of loss of overall accuracy may be used to trigger a warning signal, such as reduced accuracy of camera pose as determined by internal matchmove camera metrics or a distance from a reference measurement station.

Determining Pose Using Features at Known Locations & Observed Changes Between Common Features in Images In some embodiments, combinations of the above methods may be used to determine pose of a camera. For example, the pose may be determined from an image having features at known locations as described above. Using this pose as a reference, one or more additional images may be captured and changes in pose determined using observed changes between common features in the images as also described above. In these embodiments, it is not necessary to level the survey instrument to obtain a reference image. Instead, the image with features at known locations may be used as the reference image.

Using Pose to Determine Tilt Angle and Tilt Direction

Following is an example of some of the steps and calculations that may be used to determine tilt angle and tilt direction of a survey instrument using a pose of a camera in accordance with an embodiment of the invention. It should be appreciated that the steps and calculations described herein are exemplary and that one of ordinary skill in the art would recognize many variations, modifications, and alternatives in light of the present disclosure.

Figure 5:
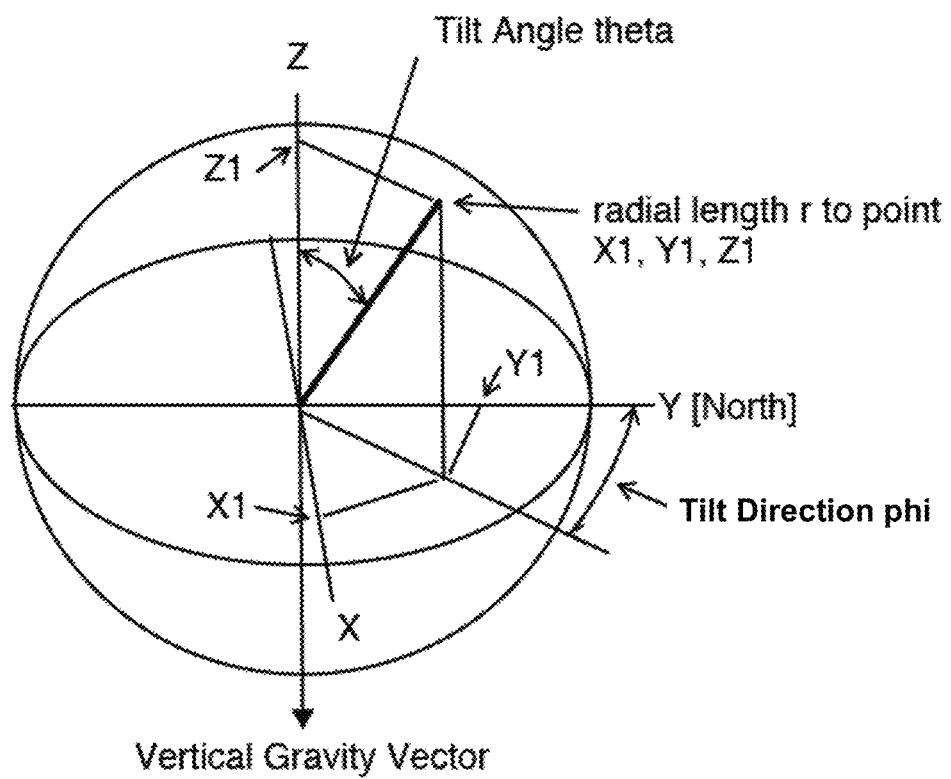
FIG. 5 is a simplified diagram of a spherical coordinate frame overlaid with a conventional Cartesian coordinate frame.

Matchmove software applications typically output pose data in a CAHV format (a convention commonly used in machine vision), whereas the reference (or coordinate) frame of interest for survey applications is spherical. Spherical coordinates provide tilt angle (generally referred to as theta) relative to a vertical axis such as a gravitational vector and tilt direction (generally referred to as phi) relative to some reference such as true or magnetic north. The tilt angle and tilt direction determine a vector r emanating from a zero reference point and extending to an imaginary point on a sphere. This is shown in FIG. 5, where a spherical coordinate frame is overlaid with a conventional Cartesian coordinate frame for reference. One or more coordinate transformations using known techniques may be used to transform the data from the CAHV format to spherical coordinates.

Figure 6:
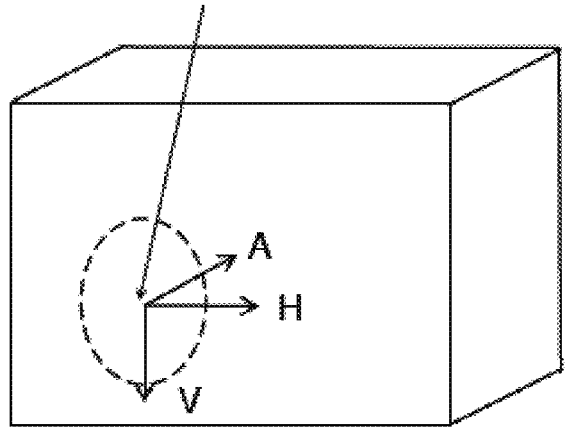
FIG. 6 is a simplified diagram of an imaging device and a CAHV reference frame.

In the CAHV format, C provides a distance from a feature in a field of view to a perspective center (or entrance pupil) of an imaging device. The perspective center is generally on an axis passing through a lens of the imaging device. As shown in FIG. 6, axes A, H, and V are orthogonal coordinate axes with +V extending downward and +A extending inward along a lens axis.

Figure 7:
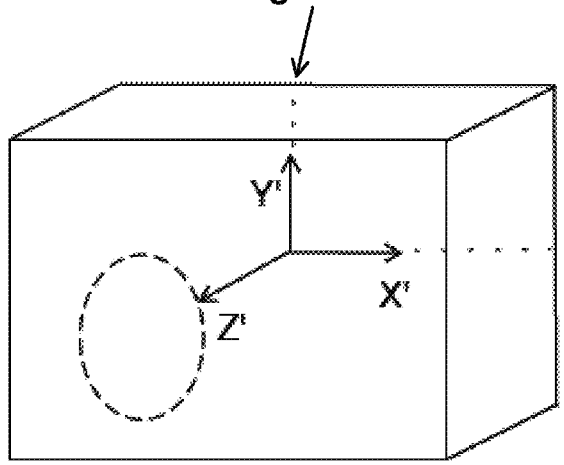
FIG. 7 is a simplified diagram of an imaging device and an X', Y', Z' camera reference frame.

A coordinate transform may be used to convert the data from the CAHV format to an intermediate X', Y', Z' camera reference frame such as that illustrated in FIG. 7. In this intermediate reference frame, X' and Y' lie along an image plane that may be near a rear of the camera, and Z' extends outward along a lens axis. The coordinate transform is described in detail in Di, K. and Li, R., "CAHVOR camera model and its photogrammetric conversion for planetary applications," J. Geophys. Res., 2004, which is incorporated herein by reference in its entirety.

Figure 8:
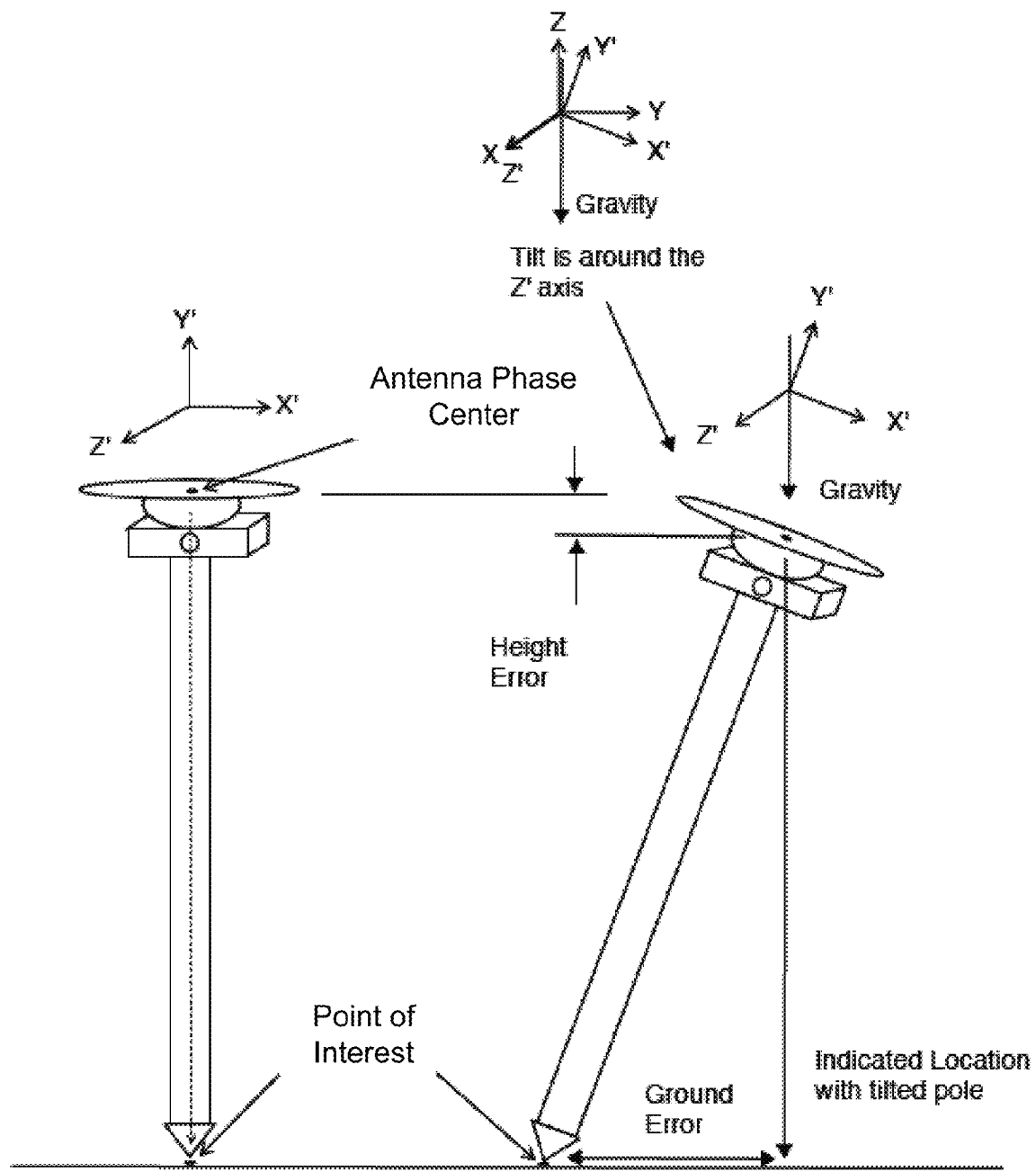
FIG. 8 is a simplified diagram illustrating an X', Y', Z' camera reference frame tilting with a survey instrument while an X, Y, Z real-world coordinate frame remains aligned with a local gravity vector.

A second coordinate transform using known techniques may be used to convert the data from the X', Y', Z' camera reference frame to a real-world (e.g., GNSS or GPS) coordinate frame. In the real-world coordinate frame, Z extends in a vertical direction parallel to a gravity vector, and X and Y extend along a horizontal plane. This is shown in FIG. 8, where the X', Y', Z' camera reference frame tilts with the an imaging device as the survey instrument is tilted from a leveled position on the left to an un-leveled position on the right.

The real-world coordinate frame does not tilt with the imaging device. This is shown at the top of FIG. 8 where the X, Y, Z axes of the real-world coordinate frame remain aligned with a local gravity vector as the X', Y', Z' axes of the camera reference frame tilt around the Z' axis.

The data may be converted from the real-world coordinate frame to spherical coordinates using known conversions. The vector r may be determined using the equation:

$$r=[X^2+Y^2+Z^2]^{1/2} \quad \text{Equation (1)}$$

Figure 9A:
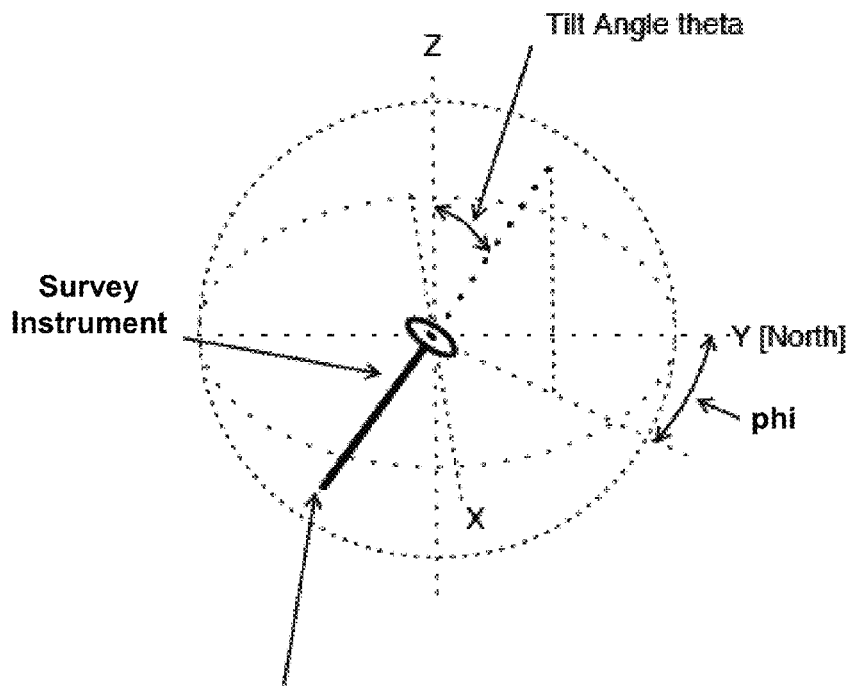
FIGS. 9A-9B are simplified diagrams showing a survey instrument in a spherical coordinate frame in accordance with an embodiment of the invention.
Figure 9B:
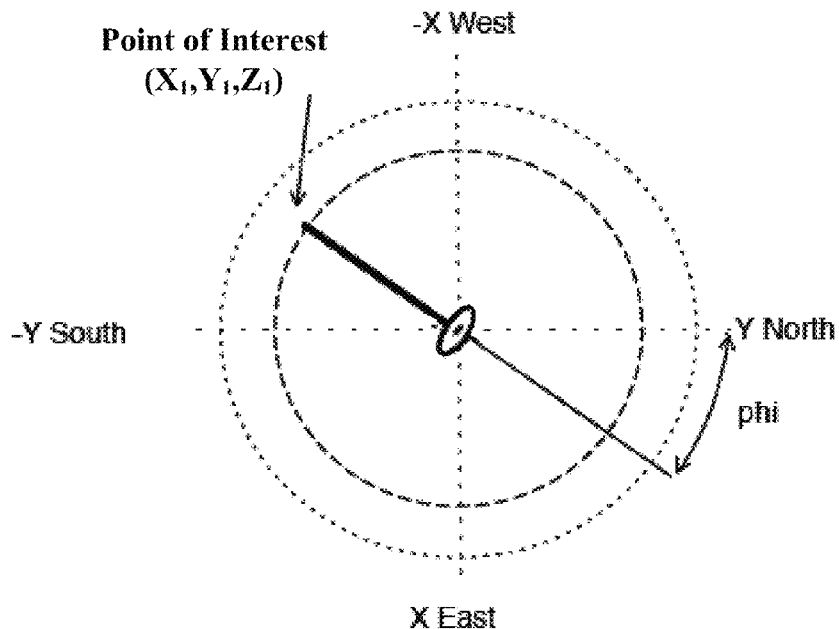

As illustrated in FIGS. 9A-9B, the vector r can represent a distance from an antenna phase center of a GNSS receiver to a point of interest located at real-world coordinates ($X_1$, $Y_1$, $Z_1$). In embodiments where the survey instrument includes a support pole, this is the distance from the antenna phase center to a tip of the support pole (typically about 2 meters). FIG. 9A is a perspective view showing a survey instrument having a tilt angle (theta) from a vertical axis Z in a northwesterly tilt direction (phi). The tilt direction (phi) is more easily seen in the top down view shown in FIG. 9B (looking down along the Z axis).

Using real-world coordinates X, Y, Z, the tilt angle and tilt direction of the survey instrument can be determined using the equations:

$$\text{Tilt Angle(theta)}=\arccos(Z/r) \quad \text{Equation (2)}$$

$$\text{Tilt Direction(phi)}=\arctan(Y/X) \quad \text{Equation (3)}$$

Determining Location of Point of Interest

A location of a point of interest can be determined using a location of a survey instrument and a tilt angle and tilt direction of the survey instrument. Referring to the example of FIG. 1, a survey instrument 102 may include a location measurement device such as a GNSS (or GPS) receiver 106. A distance along a vertical axis from an antenna phase center to a point of interest is known when a survey instrument is leveled as shown on the left in FIG. 8. Using an un-leveled survey instrument, however, as shown on the right in FIG. 8, introduces a height error and a ground error. A vertical height of the antenna phase center above the ground is unknown because of the height error, and a horizontal distance from the antenna phase center to the point of interest is unknown because of the ground error. The ground error may include X and Y components in a real-world coordinate system.

The following equations can be used to determine the X and Y components of the ground error and the Z component of the height error:

$$X_1=r*\sin(\text{theta})*\cos(\text{phi}) \quad \text{Equation (4)}$$

$$Y_1=r*\sin(\text{theta})*\sin(\text{phi}) \quad \text{Equation (5)}$$

$$Z_1=r*\cos(\text{theta}) \quad \text{Equation (6)}$$

Where r is the distance from the antenna phase center to a tip of the support pole using the survey instrument shown in the example of FIG. 8.

While methods have been described for performing survey measurements using an un-leveled survey instrument, it should be appreciated that measurement error will increase with larger tilt angles. Thus, in some embodiments the survey instrument may be configured to provide a warning (e.g., audio or visual cue) if the tilt exceeds a specified angle. In such a situation, a surveyor may repeat a measurement with the survey instrument in a more vertical position.

Example Calculation of Location of Point of Interest

Following is an example calculation of the location of the point of interest 110 shown in FIG. 1 assuming that the tilt angle is determined to be 10° from vertical and the tilt direction is determined to be 30° from north. These values can be determined using matchmove techniques and coordinate transformations as described above. Coordinates of the antenna phase center of the GNSS receiver 106 are determined to be (10 m, 3 m, 0.97 m) relative to the reference point 114 on the top surface of the cube 112 (arbitrarily assigned coordinates (0, 0, 0)), and the vector r has a length of 2 meters. Using these values and Equations (4)-(6), the location of the point of interest 110 from the antenna phase center is (−0.174 m, −0.301 m, −1.970 m). Thus, the point of interest 110 is 0.174 meters west and 0.301 meters south of the antenna phase center along X and Y axes and 1.970 meters below the antenna phase center along the Z axis.

Survey Instrument Configuration

FIGS. 10-13 are simplified diagrams of survey instruments that may be used to determine tilt angle and tilt direction in accordance with some embodiments of the invention. It should be appreciated that the survey instruments shown herein are provided merely as examples and that embodiments of the present invention may be used with other survey instruments that include different features and/or configurations.

Figure 10:
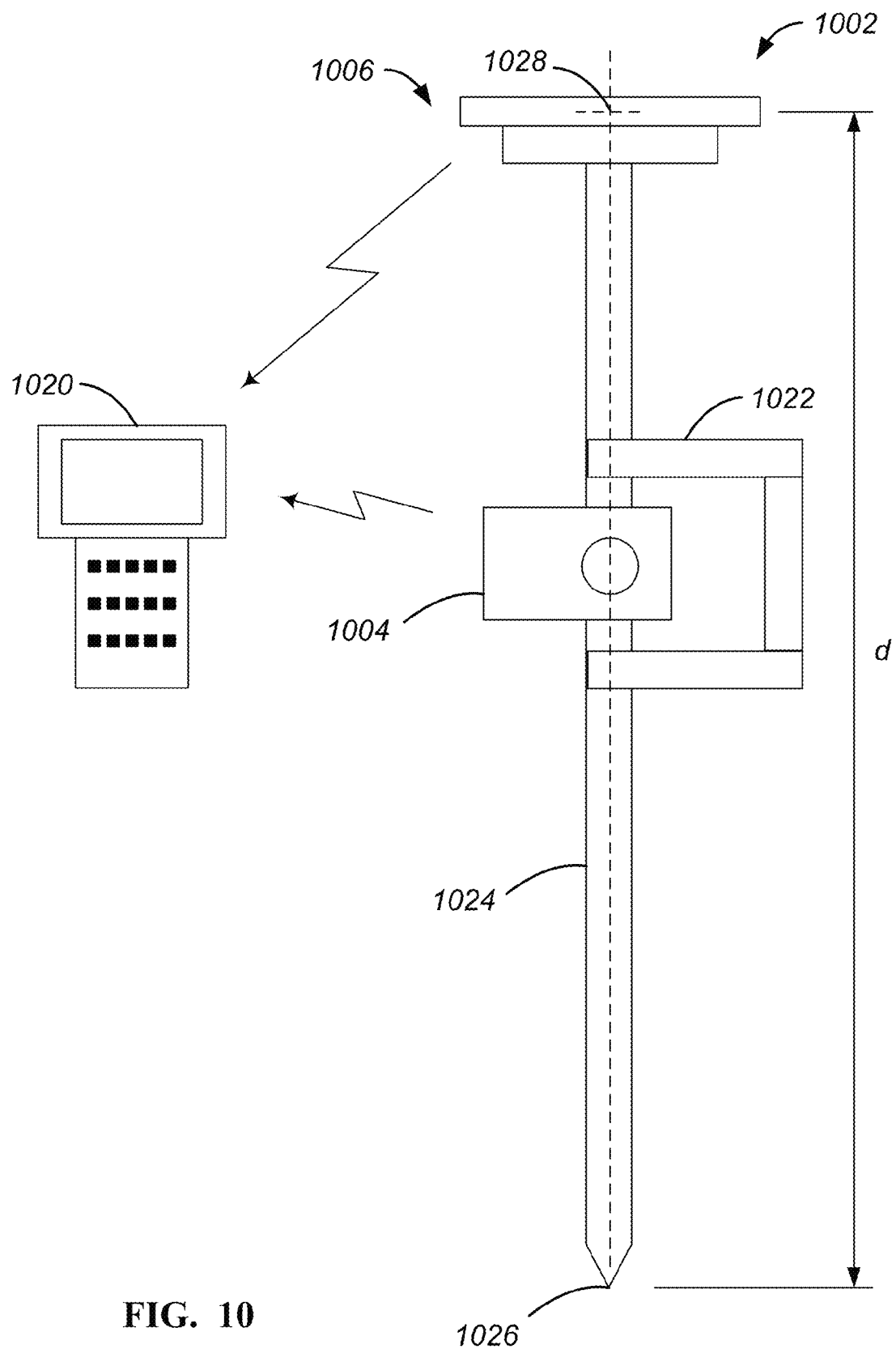
FIGS. 10-13 are simplified diagrams of survey instruments that may be used to determine tilt angle and tilt direction in accordance with some embodiments of the invention.

FIG. 10 shows a survey instrument 1002 that includes a location measurement device such as a GNSS (or GPS) receiver 1006 and an imaging device such as a camera 1004. The GNSS receiver 1006 is configured to determine a location of an antenna phase center 1028 and the camera 1004 is configured to obtain image information. The GNSS receiver 1006 and the camera 1004 are coupled to a support pole 1024. In this example, the camera 1004 is coupled to the survey instrument 1002 near a handle 1022 of the support pole 1024 rather than below the GNSS receiver as shown in the example of FIG. 1.

The GNSS receiver 1006 and the support pole 1024 are arranged such that the antenna phase center 1028 of the GNSS receiver 1006 and a tip 1026 of the support pole 1024 have a known spatial relationship (e.g., both aligned with a vertical axis and having a known length d between them). The camera 1004 may also be arranged such that the same vertical axis passes through the entrance pupil of the camera 1004. In some embodiments, a distance between the antenna phase center 1028 of the GNSS receiver 1006 and the entrance pupil of the camera 1004 may also be known.

FIG. 10 also shows a controller 1020 in electrical communication with the GNSS receiver 1006 and the camera 1004. In this example the electrical communication is wireless although other modes of communication may be used with other embodiments. The controller 1020 may include one or more inputs and one or more outputs such as the buttons and display screen shown in this figure. The controller 1020 may also be configured to send and receive data from other devices. The controller 1020 may include a processor configured to receive location information from the GNSS receiver 1006 and receive image information from the camera 1004. The processor may also be configured to determine a pose of the camera 1004 using matchmove techniques and to determine a tilt angle and tilt direction of the survey instrument 1002 as described previously. In some embodiments, the processor may also be configured to determine a location of a tip 1026 of the support pole 1024 (or a location of a point of interest).

The controller 1020 may include memory for storing the information received from the GNSS receiver 1006 and the camera 1004. Computer code may also be stored in the memory with instructions that are executable by the processor to determine the pose of the camera 1004, the tilt angle and tilt direction of the survey instrument 1002, and the location of the tip 1026 of the support pole 1024.

It should be appreciated that the processor and memory are not limited. The processor may include one or more general purpose microprocessors or application specific integrated circuits (ASICs) and at least part of the instructions may be embodied in software, firmware, and/or hardware. The memory may include an operating system and one or more software applications for determining the tasks described above in accordance with embodiments of the invention. The memory may include any type of non-transitory media including magnetic storage media, optical storage media, flash memory, and the like.

Figure 11:
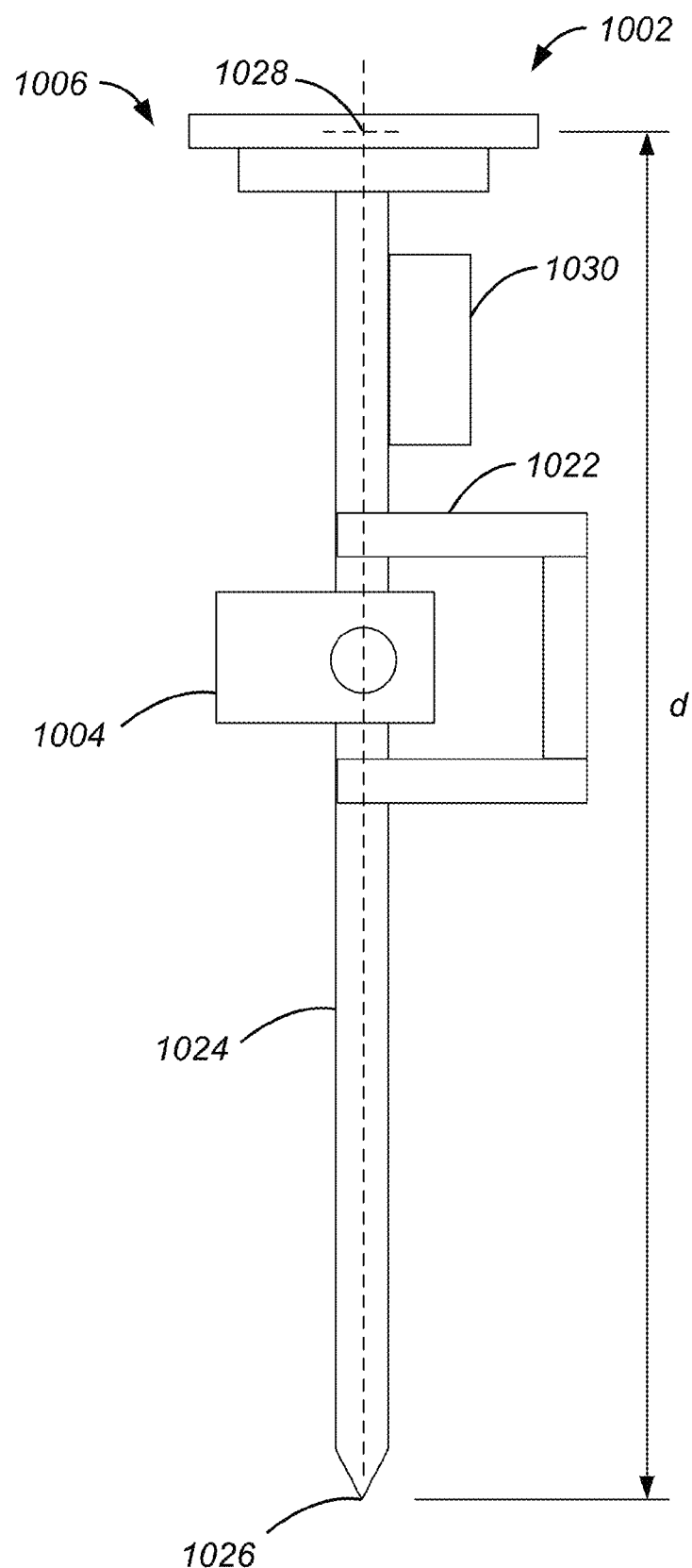

FIG. 11 shows a survey instrument 1002 similar to that of FIG. 10 except that in this example a controller 1030 is coupled to the support pole 1024. Alternatively, the controller 1030 may be integrated with the support pole or any other component of the survey instrument 1002. The controller 1030 may be configured in a manner similar to that of the controller 1020 shown in FIG. 10. The controller 1030 may be configured to electrically communicate with the GNSS receiver 1006 and the camera 1004 using wired or wireless communications. The controller 1030 may also be configured to send and receive data from other devices.

Figure 12:
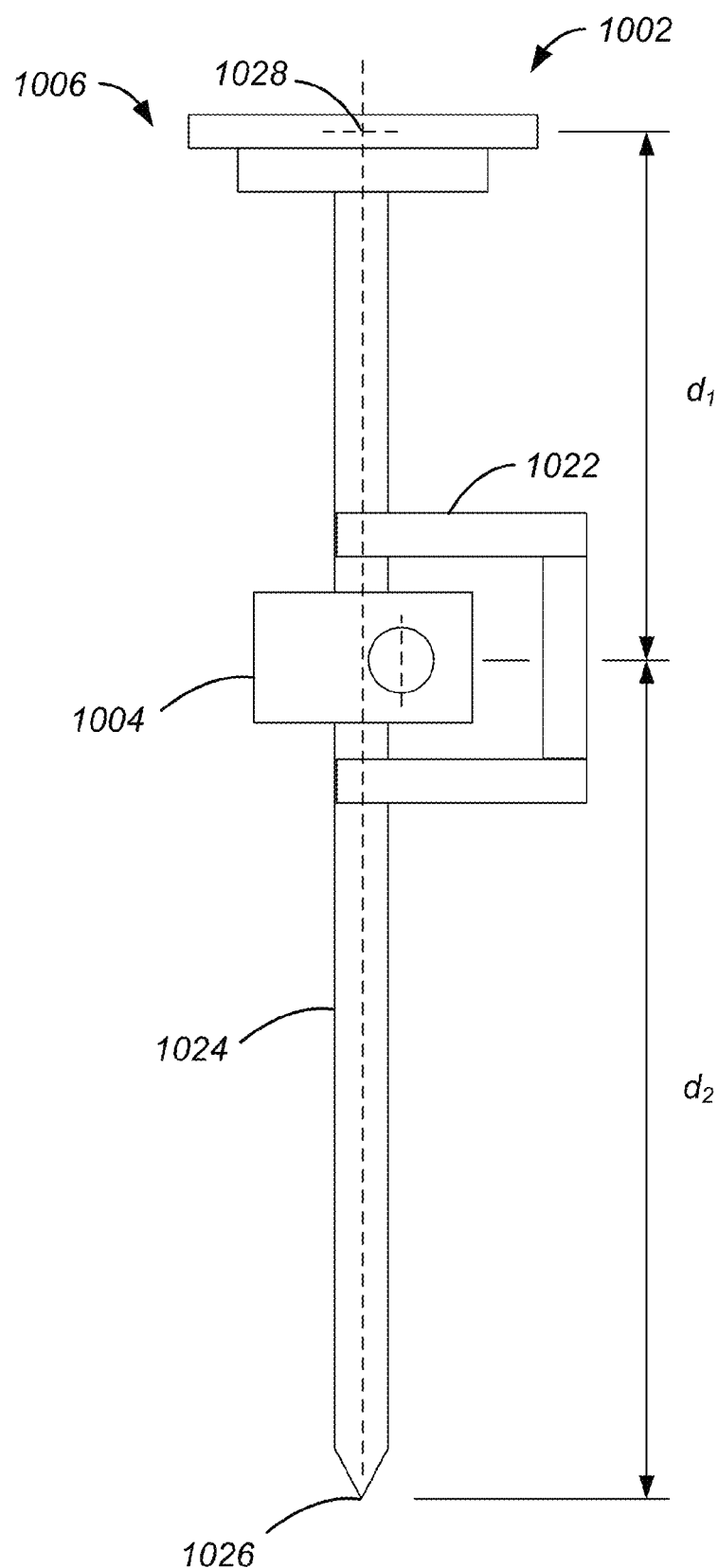

FIG. 12 shows a survey instrument 1002 similar to that of FIGS. 10-11 except that in this example the entrance pupil of the camera 1004 is not aligned with the vertical axis passing though the antenna phase center 1028 and the tip of the support pole 1024. Instead, in this example the entrance pupil of the camera 2004 is slightly off center from the vertical axis and a distance $d_1$ below the antenna phase center 1028. This configuration may be used to determine a pose of the camera 1004 and a tilt angle and tilt direction of the survey instrument 1002 using a controller (not shown) in a manner similar to the configurations shown in FIG. 10-11. If this configuration were also used to determine coordinates of the entrance pupil of the camera 1004, however, a spatial relationship (e.g., distance $d_1$ and offset from the vertical axis) between the antenna phase center 1028 and the entrance pupil must be determined.

Figure 13:
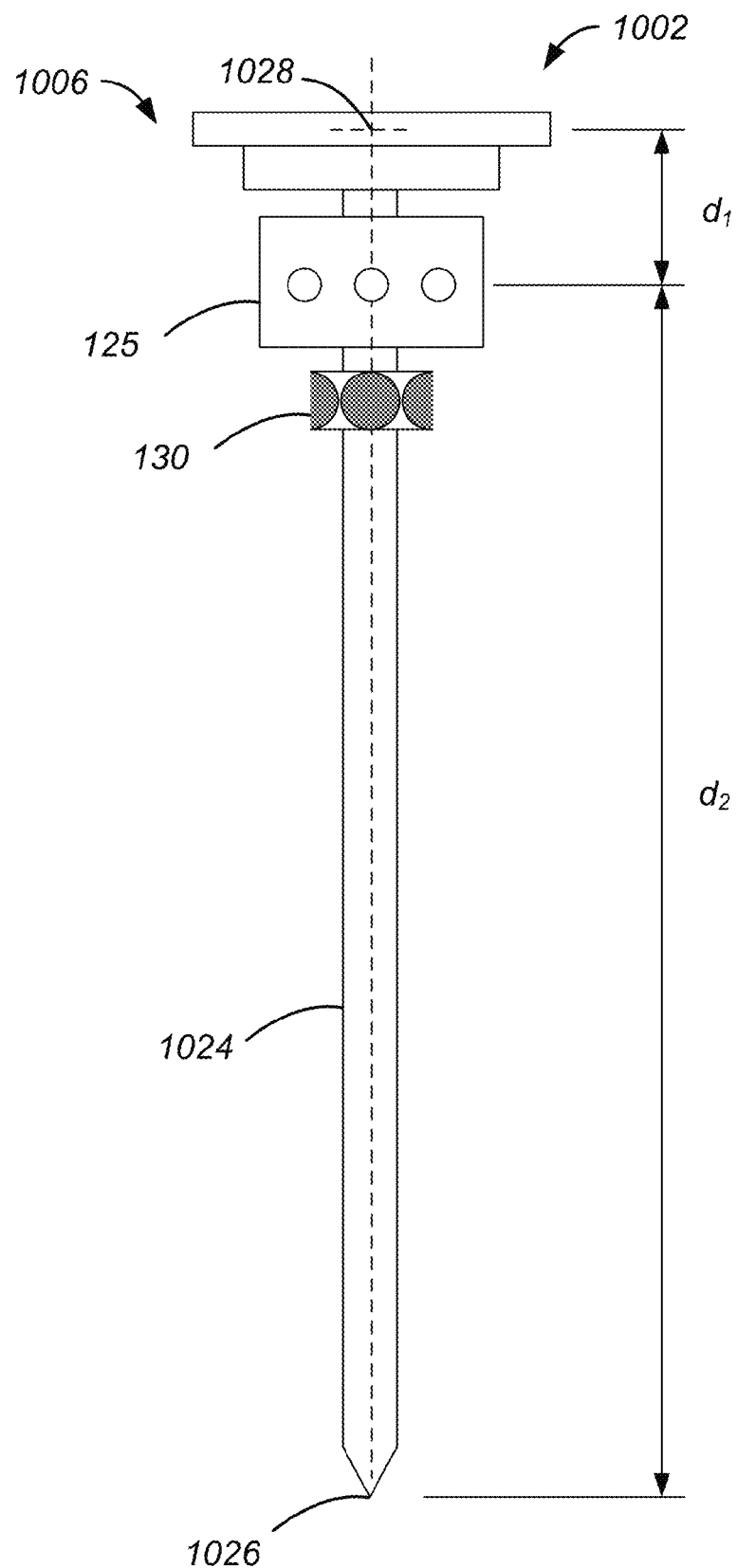

FIG. 13 shows a survey instrument 1002 similar to that of FIGS. 10-12 except that in this example the survey instrument 1002 includes an image capture system 125. The image capture system 125 includes any device, or set of devices, that is capable of capturing optical images (still or moving). The image capture system 125 may include one or more image capture devices (e.g., digital cameras) arranged around the support pole 1024 that collectively capture a panoramic image of at least a portion of the environment surrounding the survey instrument 1002.

Figure 14:
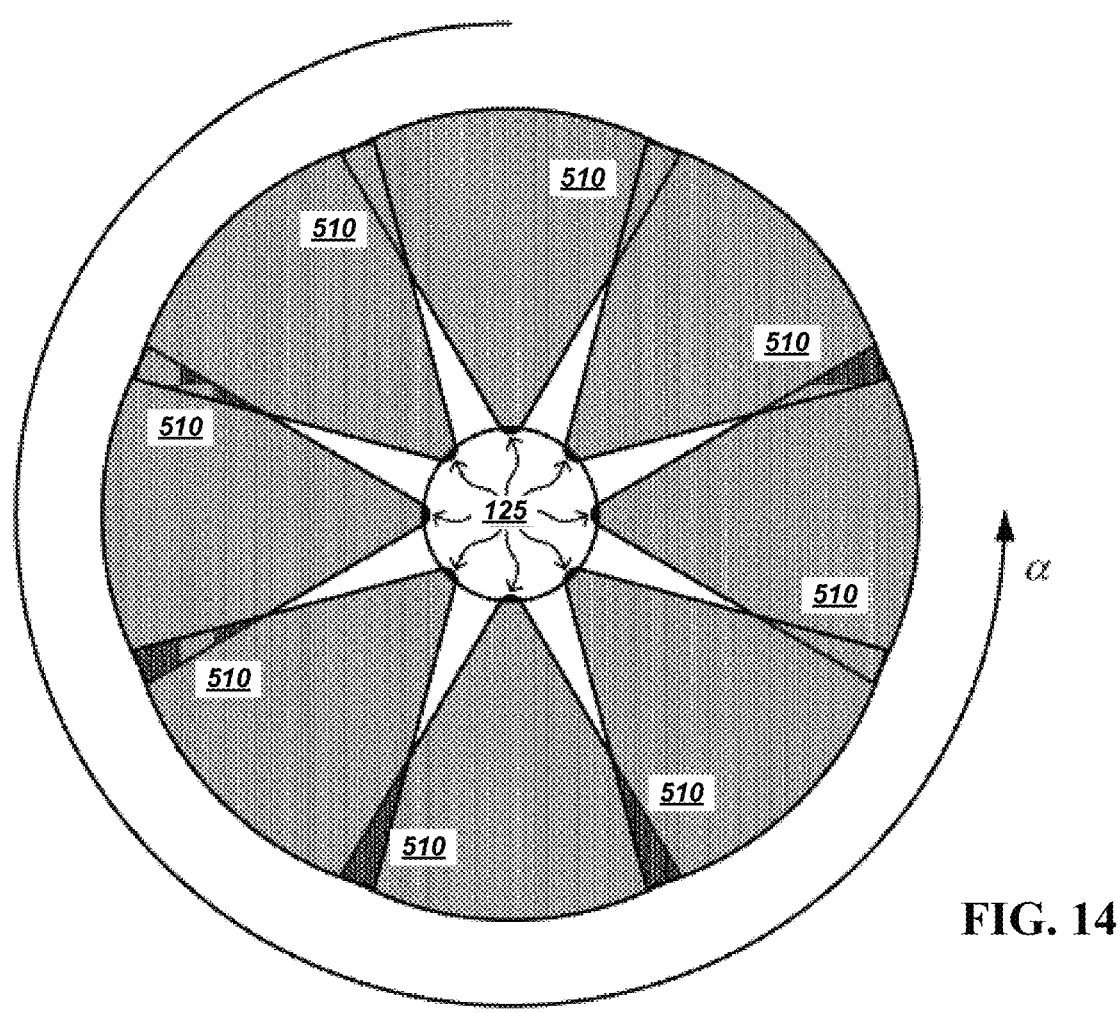
FIG. 14 is a simplified plan view of an image capture system in accordance with an embodiment of the invention.

To illustrate, FIG. 14 is a simplified plan view of the image capture system 125. In this example, the image capture system 125 includes eight cameras, although different embodiments may use more or fewer cameras. As can be seen in FIG. 14, each camera has a field-of-view 510 that overlaps with the fields-of-view of adjacent cameras at a particular distance from the image capture system 125. The overlap is determined by such factors as the number of cameras, angle of view of each camera, position or orientation of each camera, etc. Collectively, the cameras cover a panoramic (radial) field-of-view defined by an angle α. The angle α is 360° in this example. In some embodiments, the angle α may be less than 360° and/or the fields-of-view of adjacent cameras may not overlap. Alternatively, the image capture system 125 may include one or more cameras with wide-angle lenses (e.g., fisheye lenses) that can provide panoramic images that include up to a full 360° view of the surrounding environment.

The survey instrument 1002 shown in FIG. 13 also includes a prism 130. The prism 130 allows the survey instrument 1002 to function, inter alia, as an optical target for other survey instruments (e.g., total stations). The prism 130 can include any device or devices that have properties (e.g., reflectivity) that facilitate the acquisition (e.g., electronic and/or optical) of the prism 130 by another location measurement device. It should be appreciated that each of the survey instruments illustrated in FIGS. 10-13 may include a GNSS receiver 1006 and/or a prism 130 that can be used to obtain location information. Each of the survey instruments may also include any number of other devices such as controllers, distance measurement devices, tilt sensors, and the like that are not specifically illustrated in these examples.

In an embodiment, a pose of the survey instrument 1002 shown in FIG. 13 may be determined using a controller and known matchmove techniques as described above. For example, in an embodiment the pose may be determined using features in one or more images where the features are at known locations in a reference frame. In another embodiment, the pose may be determined using observed changes between common features in images where at least one of the images (or a set of the images) is acquired with the image capture system 125 in a known (e.g., leveled) position. Further, either of these methods may be used to provide a reference pose from which the pose of the image capture system 125 may be determined (or tracked) as the survey instrument 1002 is moved from location to location. Images may be captured at multiple locations that allow the pose of the image capture system 125 to be determined based on the reference. While the image capture system 215 is moving, the images may be captured at regular intervals, at periodic intervals based on factors such as distance between image capture locations, speed of movement, quality and/or number of features, and the like.

In moving the survey instrument 1002 from location to location, it is expected that some of the cameras in a multi-camera embodiment will provide more pertinent information than others based on factors such as number or quality of features or correspondences, direction of movement of the survey instrument 1002, and the like. For example, when moving the survey instrument 1002, it is expected that those cameras that are facing toward a direction of travel will often provide more pertinent information that those facing sideways or backward. This is because a change in the number of observable features from image to image may be less for the cameras facing toward the direction of travel than those facing sideways (e.g., a larger portion of the field-of-view typically changes from image to image for those cameras facing sideways). Also, for the cameras facing toward the direction of travel, the observable features are getting closer compared to those facing backwards. As another example, if the survey instrument is rotated about a vertical axis, features in each image may change in position by a similar amount. In this example, those images with more observable features (or more distinct features) may provide more pertinent information. As yet another example, a forward-facing camera tracking features that are fairly far away may provide a good rotational estimation but poor translation estimation. This is because there may be little change in image coordinates of the features. In this case, a side-facing camera may see more significant changes in image coordinates and thus provide better translation estimation. Thus, the value of the information may be environment dependent. As yet another example, cameras that are perpendicular to an axis of rotation may provide more pertinent information than cameras that are in line with an axis of rotation.

Figure 15A:
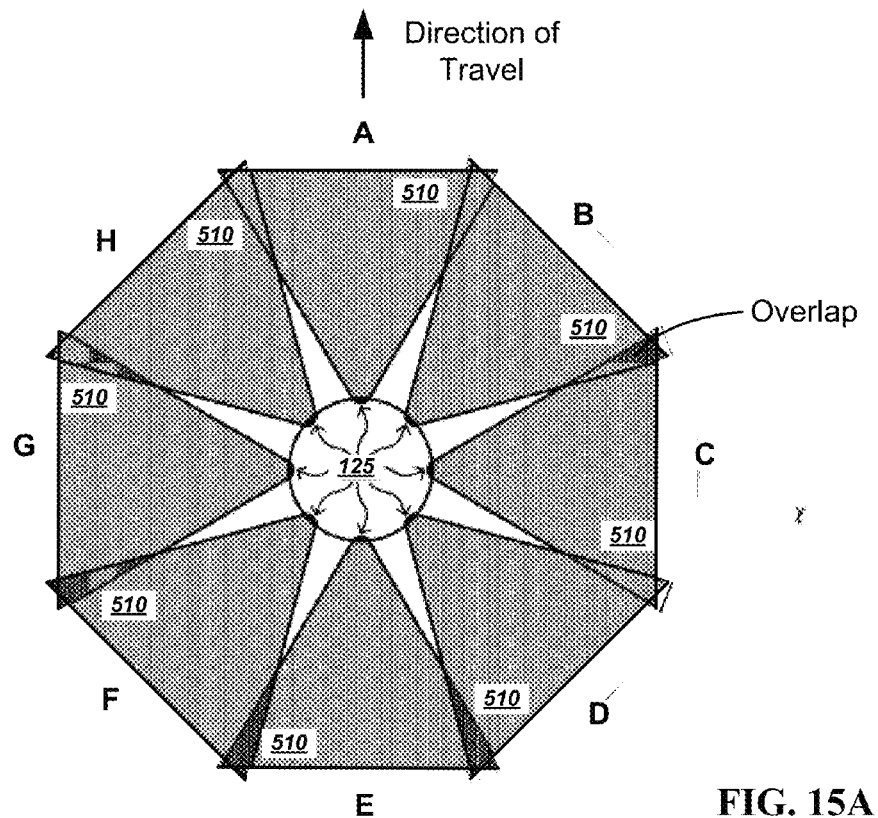
FIGS. 15A-15B are simplified diagrams that provide an example of how the pose of an image capture system may be determined as a survey instrument is moved from location to location in accordance with an embodiment of the invention.
Figure 15B:
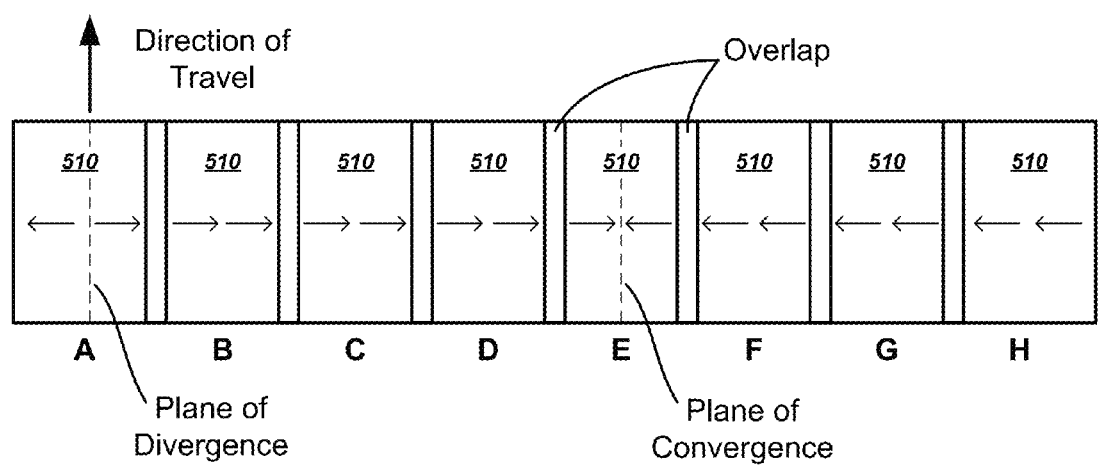

FIGS. 15A-15B provide an example of how the pose of the image capture system 125 may be determined (or tracked) as the survey instrument 1002 is moved from location to location in accordance with an embodiment. FIG. 15A is similar to FIG. 14 except that each field-of-view 510 extends to what may be referred to as an image plane. Each image plane is intended to represent the field-of-view as captured on an image sensor within each camera. In this example the image planes are labeled A-H. Each of the image planes A-H corresponds to a field-of-view 510 of one of the cameras of the image capture system 125. FIG. 15B shows each of the same image planes A-H arranged side-by-side with an overlap region between adjacent image planes.

FIGS. 15A and 15B each identify a direction of travel as being aligned with image plane A. The direction of travel may be used in assigning weighting factors to each of the images. The weighting factors may be associated with a relative contribution of each of the images in determining a pose of the image capture system 125. In an embodiment, a sum of the weighting factors may add up to 1.0, and the pose of the image capture system 125 may be determined using the pose from each of N images using the equation:

$$\text{Pose}_{(image\ Capture\ System)} = WF^1 * \text{Pose}^1 + WF^2 * \text{Pose}^2 + WF^3 * \text{Pose}^3 + WF^N * \text{Pose}^N \quad (7)$$

where $WF^N$ is the weighting factor for the $N^{th}$ image, and $\text{Pose}^N$ is the pose determined based on the $N^{th}$ image.

An approximate direction of travel may be determined based on movement (or change in image location) of features between images. The accuracy of the approximation may depend on a number of variables including the path between locations, frequency of changes in direction of travel while moving from location to location, magnitude of the changes in direction of travel, frequency of image acquisition while moving, changes in orientation of the survey instrument relative to the direction of travel, etc.

As an example, each of the image planes A-H in FIG. 15B include arrows that represent horizontal components of movement of features between images acquired at different locations. Moving in the direction of travel identified in FIGS. 15A-15B and considering only the horizontal components of the movement, those features captured in images using the forward facing camera (image plane A) will appear to diverge from a vertical plane aligned with the direction of travel, and those features captured in images using the backward facing camera (image plane E) will appear to converge on a vertical plane opposite the direction of travel. Those features captured in images using right facing cameras (image planes B, C, D) will appear to move from left to right, and those features captured in images using left facing cameras (image planes H, G, F) will appear to move from right to left. Thus, a direction of travel (or approximate direction of travel) may be determined by locating a vertical plane of divergence using image analysis.

Figure 16A:
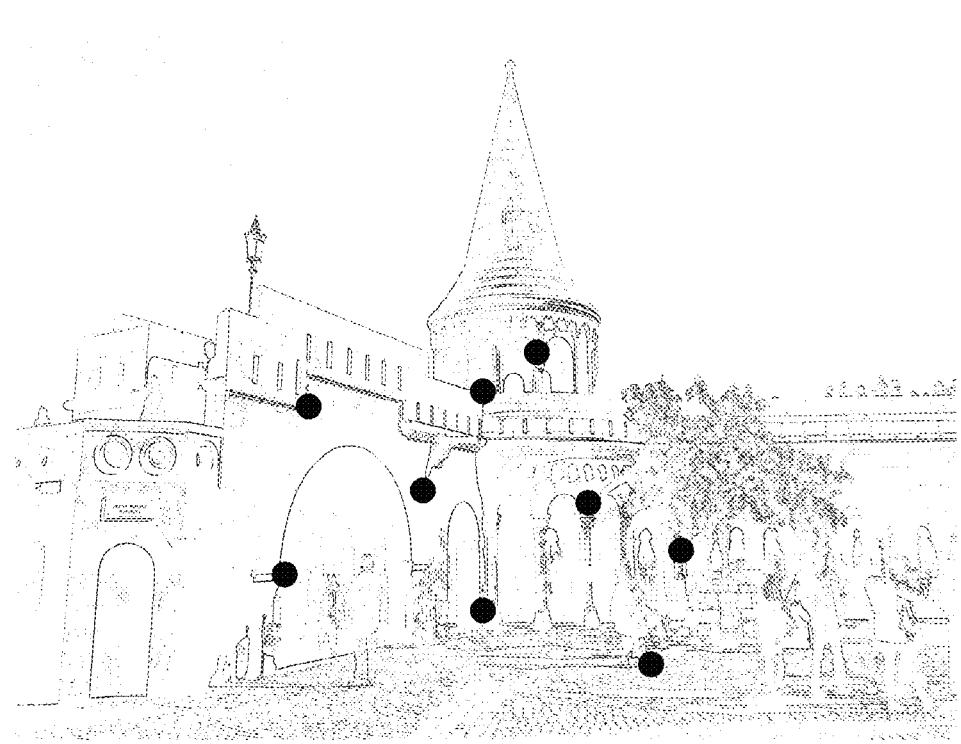
FIGS. 16A-16B are simplified diagrams that provide a visual example of how a direction of travel may be determined in accordance with an embodiment of the invention.
Figure 16B:
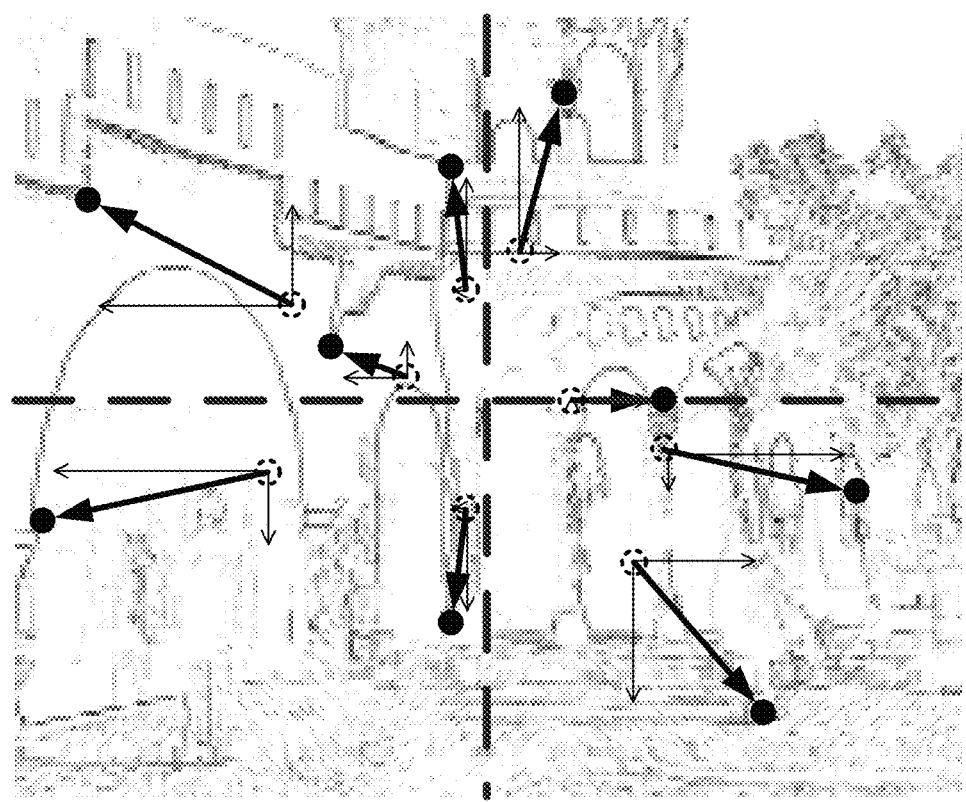

FIGS. 16A-16B provide a visual example of how a direction of travel can be determined. FIG. 16A is an image of a building captured at a first location with a camera facing the building. Nine features (corresponding to objects or points in the environment) are identified with black dots. The nine features are used merely as an example, and typical feature identification techniques may identify hundreds of features in a single image. FIG. 16B is captured at a second location nearer the building with the camera facing in the same direction. The same nine features that were identified in FIG. 16A with black dots are identified in FIG. 16B with black dots. FIG. 16B also includes dotted circles representing the image locations of the features from FIG. 16A and dark arrows representing movement of the features between the images. FIG. 16B also includes lighter arrows representing horizontal and vertical components of the movement.

The image location of each feature moves radially outward from a point aligned with the direction of travel. This point may be referred to as a point of divergence (or focus of expansion). In FIG. 16B, the point of divergence is near a center of the image and is identified by the intersection of the dashed lines. The vertical and horizontal dashed lines each represent a plane of divergence. The image locations of features to the right of the vertical plane move to the right, features to the left of the vertical plane move to the left, features above the horizontal plane move toward the top, and features below the horizontal plane move toward the bottom. A magnitude of the vertical and horizontal components of movement increases with distance from the point of convergence. As can be seen in FIG. 16B, the vertical plane of divergence (vertical dashed line) is located where the horizontal components of the movement are near zero.

Images from a camera pointing in the opposite direction will have a point of convergence opposite the direction of travel. The image location of each feature moves radially inward toward the point of convergence as the camera moves away. A vertical plane of convergence can be identified at the point where the horizontal components of movement near zero. Identifying the vertical plane of convergence can provide an effective method for confirming the direction of travel.

Although there are a number of ways the direction of travel can be determined, some embodiments use the horizontal components of the movement as described above. For features in sideways facing images, the horizontal components of the movement will all be in the same direction (either left to right or right to left). In an embodiment, the movement from left to right may be considered positive, and movement from right to left may be considered negative. Thus, in a right facing image (relative to the direction of travel), the horizontal components of the movement for all of the features will be positive, while in a left facing image (relative to the direction of travel), the horizontal components of the movement for all of the features will be negative. For features in images that are aligned with the direction of travel or opposite the direction of travel, the horizontal components of movement will be both positive and negative. Thus, the images most closely aligned with the direction of travel are those where the horizontal components of movement are both positive and negative. For a forward facing image, the horizontal components of movement will be negative at the left edge of the image and positive at the right edge of the image. For a backward facing image, the horizontal components of the movement will be positive at the left edge of the image and negative at the right edge of the image.

Once the forward facing image is identified, a more accurate determination of the direction of travel can be made by identifying the vertical plane of convergence. FIGS. 17A-17C are simplified diagrams illustrating a method of identifying the vertical plane of divergence in accordance with an embodiment.

FIG. 17A shows an image 1702 captured by a forward facing camera. The actual image data (or features captured in the image 1702) is not shown to avoid unnecessary clutter. This figure shows a horizontal line near a center of the image 1702 that represents a horizontal axis of the image. The horizontal axis passes through an optical center of the image and corresponds to the horizontal plane of divergence. This horizontal axis is shown merely for completeness, and it is not necessary to identify the horizontal axis to find the vertical plane of convergence.

In FIG. 17A the image 1702 is divided into Segments 1-10 (although any number of segments may be used). Vertical lines are used in the figure to identify the different segments. Each segment may represent a vertical strip of image data. The vertical strips may be defined in any manner. For each segment, the horizontal components of movement are determined for features that are tracked between images. A value (e.g., a sum or average of the horizontal components) can be determined for each segment.

For those segments to the left of the segment that includes the vertical plane of divergence (Segments 1-3 in this example), the value will be negative.

For those segments to the right of the segment that includes the vertical plane of divergence (Segments 5-10 in this example), the value will be positive.

For the segment that includes the vertical plane of divergence (Segment 4 in this example), the value may be positive or negative, but it will be less than the other segments. This is because the magnitude of the horizontal components increases with distance from the vertical plane of divergence. This is also because there are likely both positive and negative components in this segment that further reduce the value. This is illustrated in FIG. 17B, which is an expanded view of Segment 4 from FIG. 17A. FIG. 17B shows six features each identified with a black dot. This figure also includes dotted circles showing the image locations of the features from a previous image and arrows representing movement of the features between the images. The horizontal components of movement for the four features on the left are negative, while the horizontal components of movement for the two features on the right are positive.

Note that if the vertical plane of divergence was aligned with a boundary between segments, the adjacent segments would each have a value that is less than the other segments of the same sign (either positive or negative). Explained in a different way, the segment to the immediate right of the plane of divergence would have a lower value than other segments to the right, and the segment to the immediate left of the plane of divergence would have a lower value than the other segments to the left.

Once the segment (or segments) that includes (or are nearest to) the vertical plane of divergence is identified, the process may be repeated one or more times by dividing the segment (or segments) into ever smaller segments that allow more accurate determination of the direction of travel. This is illustrated in FIG. 17C, where Segment 4 from FIG. 17A is divided into two segments, allowing a determination to be made that the vertical plane of divergence is in the right segment. Typical feature identification techniques track hundreds of features between images, so there are normally a sufficient number of features to accurately identify the vertical plane of divergence.

In some cases, the direction of travel may be aligned with a boundary between images. In these situations, the images from adjacent cameras will have horizontal components of movement in opposite directions. If the adjacent images overlap, a more accurate determination of the direction of travel may depend on the number and location of the features in the overlapping region. The process described with regard to FIGS. 17A-17C may be performed on both of the adjacent images to more accurately identify the vertical plane of divergence.

Figure 18:
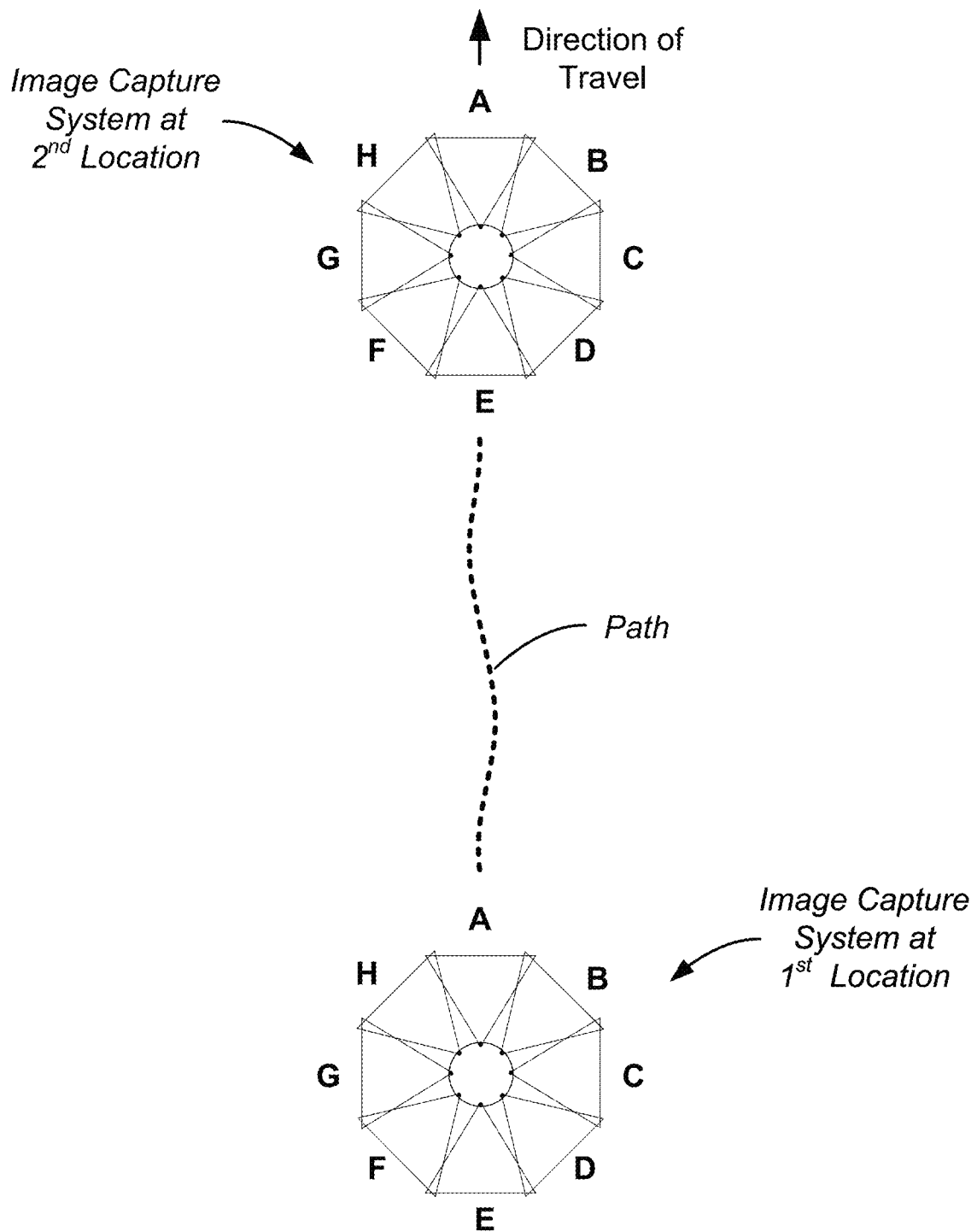
FIG. 18 is a simplified diagram illustrating a method of determining an orientation of images relative to a reference in accordance with an embodiment.

FIG. 18 is a simplified diagram illustrating a method of determining an orientation of images relative to a reference in accordance with an embodiment. This figure shows an image capture system that is moved along a path from a 1st location to a 2nd location. The image capture system may be part of a survey instrument similar to that described above with regard to FIG. 13. A set of images is acquired at each location (each set associated with image planes A-H). A direction of travel (or a plane of divergence) may be determined at the 2nd location using the images as explained above with regard to FIGS. 17A-17C. An actual direction of travel between the 1st location and the 2nd location may be determined (e.g., using a compass or location measurements at the 1st and 2nd locations using a GNSS receiver from which to derive a direction vector from the 1st and 2nd location measurements). This provides an actual direction of travel relative to either magnetic or true north. The direction of travel (or plane of divergence) determined using the images can be associated with the actual direction of travel to provide an orientation of the images relative to either magnetic or true north.

Figure 19:
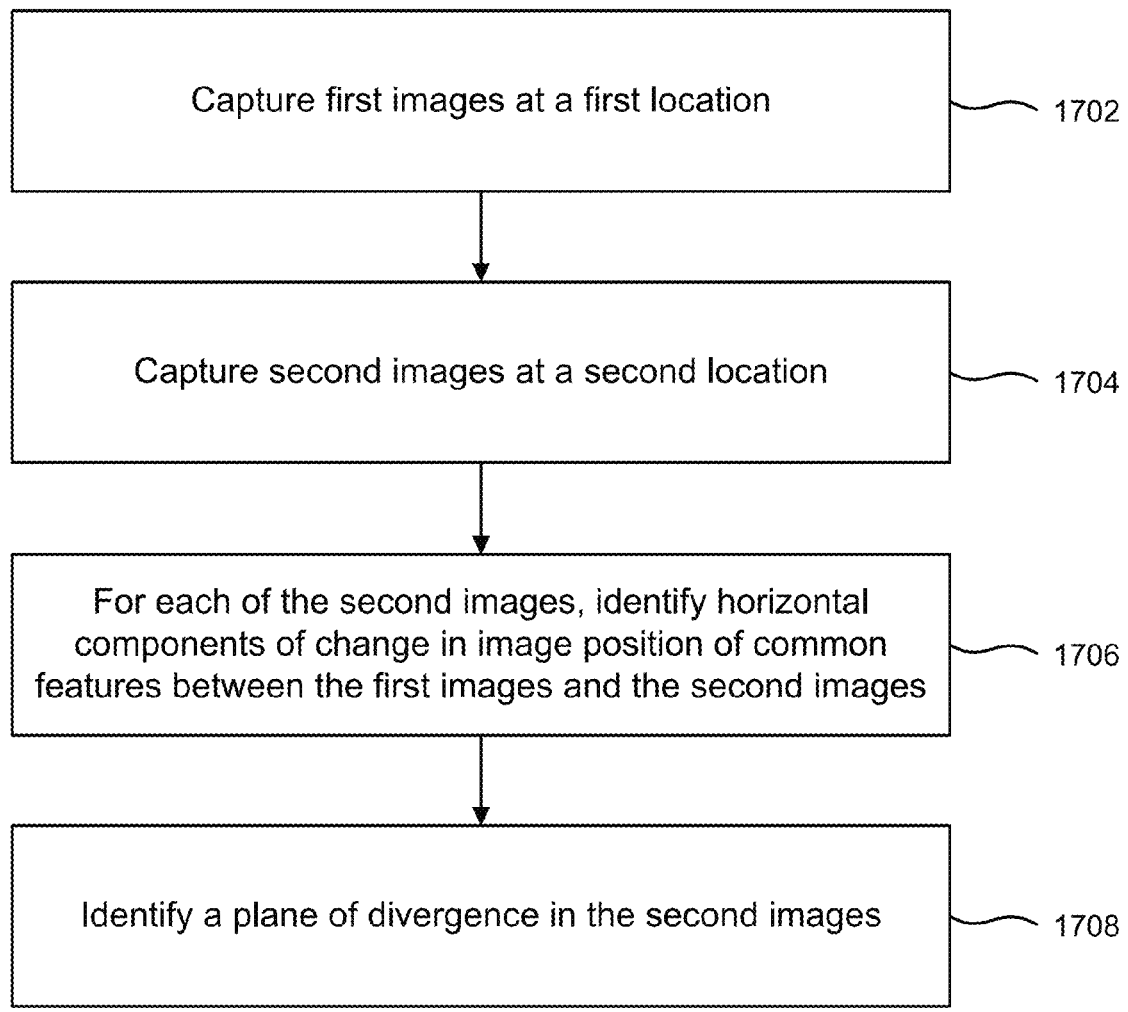
FIG. 19 is a flowchart providing a method of determining a direction of travel in accordance with an embodiment of the invention.

FIG. 19 is a flowchart providing a method of determining a direction of travel that may be utilized with an image capture system that includes a plurality of cameras in accordance with an embodiment. The method involves identifying a vertical plane of divergence. The method includes capturing first images at a first location (1702) and capturing second images at a second location (1704). For each of the second images, the method also includes identifying horizontal components of change in image position of common features between the first images and the second images (1706). Based on the change in image position of the common features, the vertical plane of divergence is identified in the second images (1708). The image that includes the vertical plane of divergence may have horizontal components of change that are in opposite directions (right to left and left to right). The horizontal components of change may be negative at the left edge of the image (right to left) and positive at the right edge of the image (left to right). The image may be further segmented and the process described above with regard to FIGS. 17A-17C repeated one or more times to more accurately identify the vertical plane of divergence. The vertical plane of divergence provides an approximation of the direction of travel. A vertical plane of convergence will be opposite the vertical plane of divergence and can be identified to confirm that the direction of travel has been correctly identified. Similar methods may be used to determine rotation about horizontal and vertical axes by comparing vertical and/or horizontal components of change between images.

Once a direction of travel (and/or rotation about horizontal and vertical axes) has been determined, weighting factors may be assigned to each of the images so that more weight may be given to those images that are more likely to provide more pertinent information when determining pose. Referring to FIGS. 15A-15B as an example, images from the camera aligned with the direction of travel (image plane A) and those adjacent it (image planes B and H) may be weighted more heavily than those facing perpendicular to the direction of travel (image planes C and G), slightly backwards (image planes D and F), and/or opposite the direction of travel (image plane E). Merely by way of example, when the direction of travel is aligned with image plane A, weighting factors of 0.2 (20%) may be assigned to images from image planes A, B, H, weighting factors of 0.1 (10%) may be assigned to images from image planes C, D, F, G, and a weighting factor of 0 (0%) may be assigned to images from image plane E. As another example, images that are perpendicular to an axis of rotation may be weighted more heavily than those that are in line with an axis of rotation.

Figure 20:
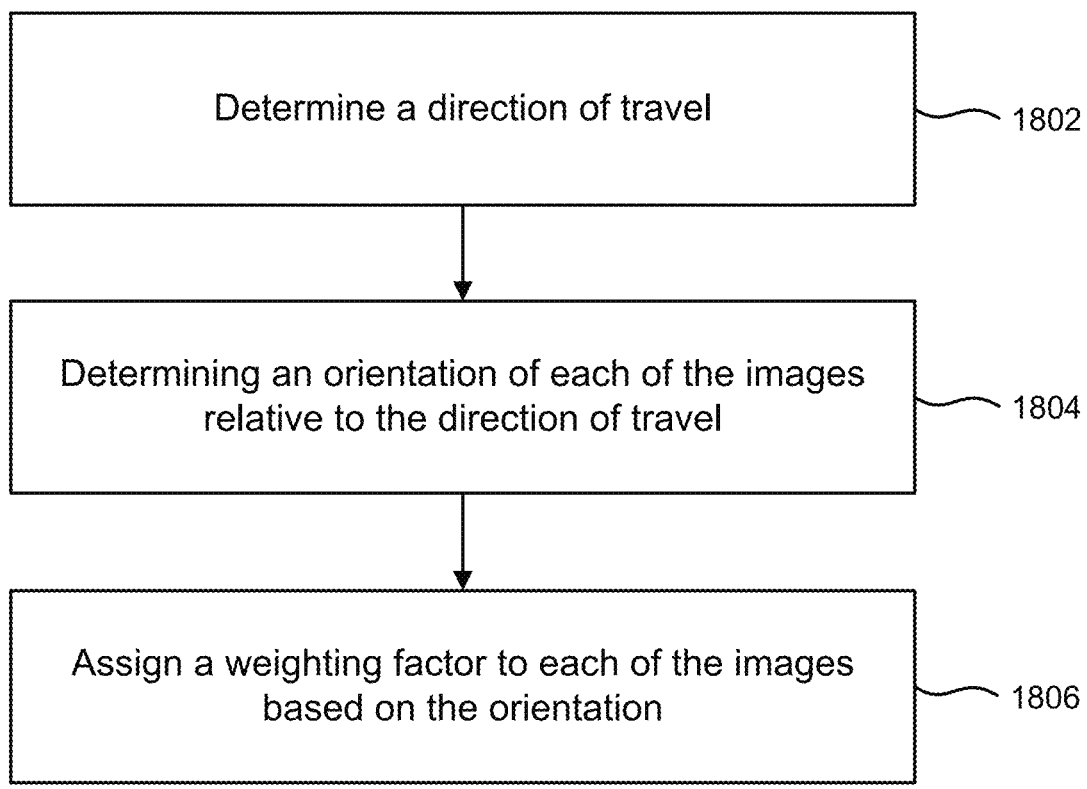
FIG. 20 is a flowchart providing a method of assigning weighting factors to different images based on direction of travel in accordance with an embodiment of the invention.

FIG. 20 is a flowchart providing a method of assigning weighting factors to different images based on direction of travel in accordance with an embodiment. The method may be utilized with an image capture system that includes a plurality of cameras. The method includes determining a direction of travel (1802). The direction of travel may be determined using any method including the plane of divergence method described above. The method also includes determining an orientation of each of the images relative to the direction of travel (1804) and assigning a weighting factor to each of the images based on the orientation (1806). Merely by way of example, the image (or images) most closely aligned with the direction of travel may be assigned one weighting factor, the next closest images (or the images that are adjacent to the closest images) may be assigned another weighting factor, and so on until the image (or images) that are farthest (or opposite) the direction of travel are assigned another weighting factor. Generally the image (or images) that is nearest the direction of travel is assigned a larger weighting factor than those that are farthest from the direction of travel. The pose of the image capture system may be determined based on the pose of each image weighted according to the weighting factors.

The direction of travel may be determined in any manner (including using a compass or consecutive location measurements from the GNSS receiver 1006) and is not limited to the plane of divergence method described above. Also, any other weighting factors and/or distribution of weighting factors may be used in accordance with embodiments described herein (including equally weighted). For example, the distribution of weighting factors may be determined using one or more functions that minimize error in the calculated pose. Further, it is not required that weighting factors be used in determining the pose of the image capture system 125 shown in FIG. 13. For example, an average pose may be determined from the pose of each camera.

Alternatively, a quality metric may be associated with the pose from each camera and a weighted average determined based on the quality metric. As yet another example, the quality metric may be used with a threshold and only those poses associated with quality metrics that meet the threshold may be used in determining the average pose. The quality metric may be determined based on number of observable features in an image or common features between images, a change in position of features between images, a distance between features in an image (e.g., how spread out they are), distinctness of features in images, and/or the like.

Some embodiments may use images only from those cameras that are aligned with a direction of travel to determine pose. The general direction of travel may be determined using any technique including those described above. Alternatively, the survey instrument 1002 may have a reference point or mark that is held in a particular orientation relative to the direction of travel so that the position of each camera relative to the general direction of travel may be known. This information may be used independently or in conjunction with location information obtained from the GNSS receiver 1006.

In another embodiment, a set of two or more cameras may be mounted on the side of a survey instrument that is associated with a direction of travel. In this case, each image may be equally weighted when determining the pose of the survey instrument. For example, if three cameras are mounted so as to provide an approximately 180° view of the surrounding environment, and a user orients the survey instrument during movement so that the cameras face the direction of travel, then each image may be equally weighted when determining pose. Alternatively, images from the one or more cameras that are most closely aligned with the direction of travel may be weighted more heavily than images from the other cameras.

In another embodiment, images from each of the cameras may be combined to form a panoramic image in accordance with known image processing techniques. Alternatively, one or more wide-angle lenses can be used to provide a panoramic image. The camera (or cameras) can be arranged to provide a partial view of the surrounding environment (e.g., a 180°-200° view) or up to a full 360° view of the surrounding environment. A pose of the image capture system can be determined using features in the panoramic image where the features are at known locations in a reference frame. The pose of the image capture system can also be determined using observed changes between common features in panoramic images where at least one of the composite images is acquired with the image capture system in a known (e.g., leveled) position.

In determining the pose of the image capture system, each part of the panoramic image may be equally weighted or weighting factors may be used as described above. For example, in an embodiment a panoramic image may be divided into a number of segments, and the segment containing the plane of divergence can be identified as described above with regard to FIGS. 17A-17C. Each segment may then be weighted based on an orientation relative to the plane of divergence (or direction of travel). Alternatively, once a direction of travel is determined, a front part (e.g., up to 180°) of the panoramic image can be weighted more heavily than a back part of the panoramic image.

As an alternative to identifying the plane of divergence, the panoramic image may be divided into a number of segments relative to a position of a reference point or a mark on the survey instrument. A user can hold the reference point or mark in a particular orientation relative to the direction of travel so that the position of each segment of the panoramic image relative to the general direction of travel may be known.

Regardless of the method used to obtain pose, a tilt angle and a tilt direction may be determined based on the pose using known transformations and Equations (1)-(3) as described above. Equations (4)-(6) may be used to determine X and Y components of a ground error and a Z component of a height error for each camera or for the image capture system 125.

Figure 21:
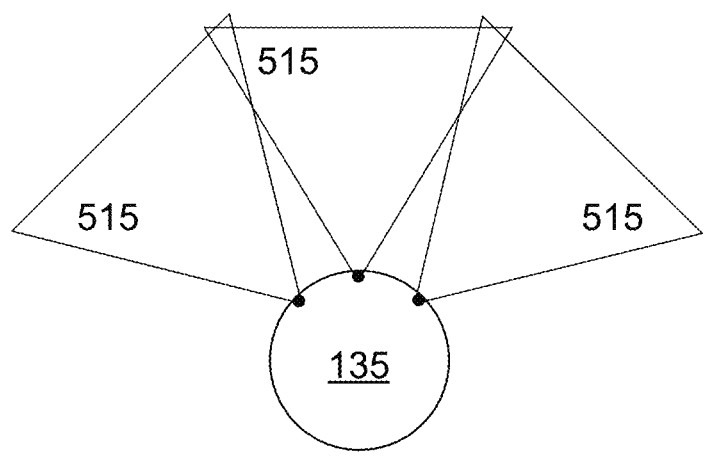
FIGS. 21-24 are simplified diagrams of survey instruments that may be used to determine tilt angle and tilt direction in accordance with some embodiments of the invention.

FIG. 21 is a simplified plan view of an image capture system 135 that may be part of a survey instrument similar to the survey instrument 1002 shown in FIG. 13. The image capture system 135 may include any device, or set of devices, that is capable of capturing optical images (still or moving). As shown in this example, the image capture system 135 may include one or more image capture devices (e.g., digital cameras) having fields-of-view 515 that collectively capture an image of at least a portion of the environment surrounding the survey instrument. While the image capture system 135 in this example includes three cameras, any number of cameras may be arranged to capture images that collectively provide any field-of-view including one of between about 45° to up to about 180° or more.

Figure 22:
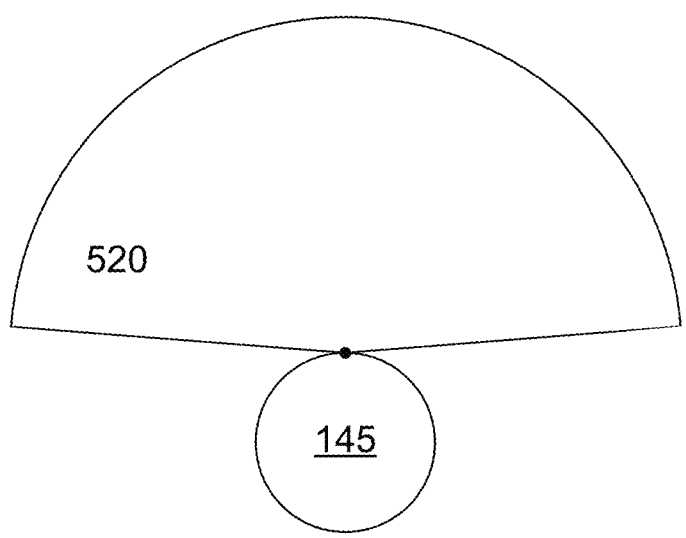

FIG. 22 is a simplified plan view of an image capture system 145 similar to the image capture system 135 of FIG. 22, except that in this example a single camera is used that provides a wide-angle field-of-view 520. The wide-angle field-of-view 520 may be an angle of view of between about 45° to up to about 180° or more.

Any of the embodiments described in this application may be used to determine a direction of travel using the image capture systems 135, 145 shown in FIGS. 21-22. Similarly, the image capture systems 135, 145 may be used with any of the survey instruments described in this application to determine a location of a point of interest or to determine a tilt angle and a tilt direction as described in the various embodiments.

Figure 23:
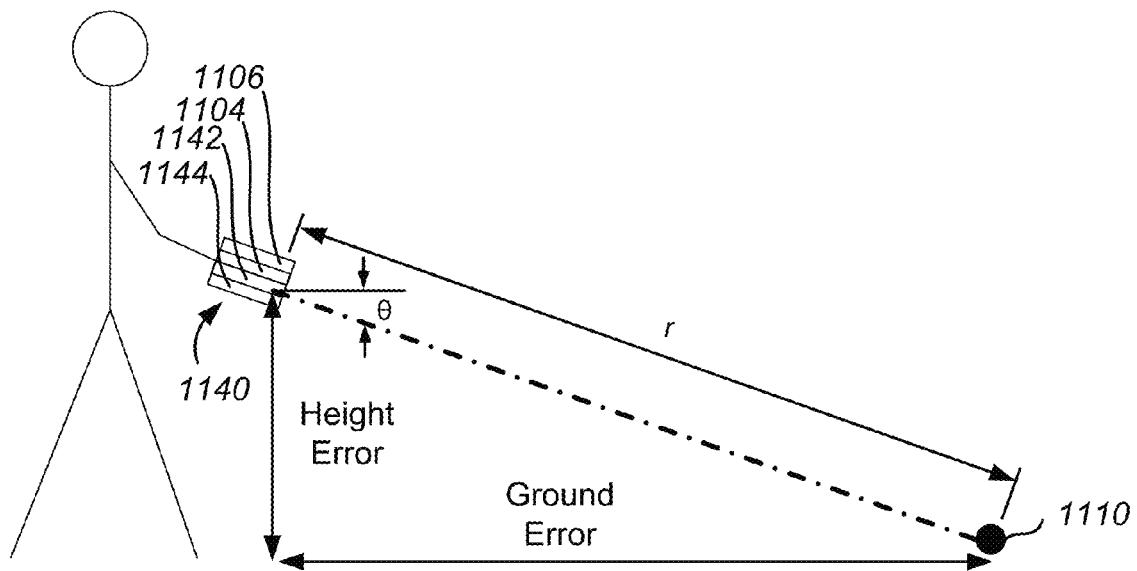

FIG. 23 is a simplified diagram of a handheld device 1140 that may be used to determine tilt angle and tilt direction in accordance with an embodiment of the invention. The handheld device 1140 may include a location measurement device such as a GNSS (or GPS) receiver 1106 and an imaging device such as a camera 1104. In the example shown in FIG. 23, the GNSS receiver 1106 and the camera 1104 are integrated within the handheld device 1140. The handheld device 1140 also includes a distance measuring device 1142 for determining a distance r between the handheld device 1140 and the point of interest 1110. The distance measuring device 1142 may be a conventional electronic distance measurement (EDM) device or may determine distance using known sonic measurement techniques. The handheld device 1140 may also include a pointing device 1144 such as a laser pointer for aligning the handheld device 1140 with a point of interest 1110.

A pose of the handheld device 1140 (or the imaging device) may be determined using a controller (not shown) and known matchmove techniques as described above. For example, the pose may be determined using features in an image where the features are at known locations in a reference frame. The pose may also be determined using observed changes between common features in images where at least one of the images is acquired with the imaging device in a known (e.g., leveled) position. A tilt angle (theta) and a tilt direction (phi) may then be determined using known transformations and Equations (1)-(3) as described above. Equations (4)-(6) may be used to determine X and Y components of a ground error and a Z component of a height error.

Figure 24:
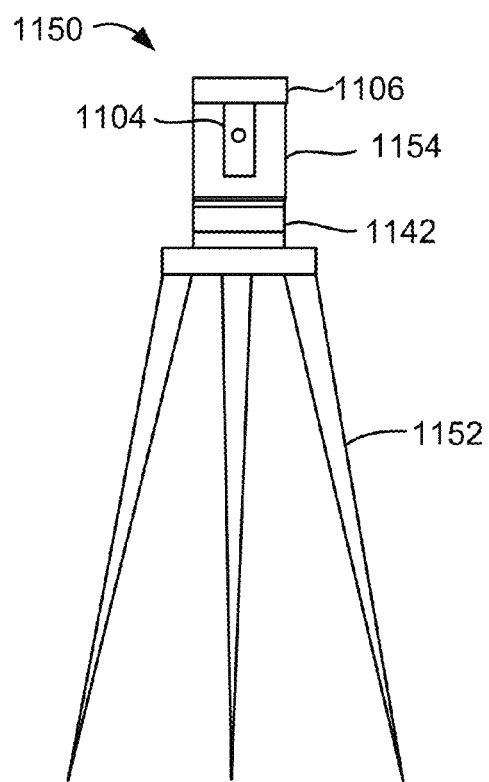

FIG. 24 is a simplified diagram of an optical survey instrument 1150 (such as an optical total station) coupled to a tripod 1152 that may be used to determine tilt angle and tilt direction in accordance with an embodiment of the invention. The optical survey instrument 1150 may include a location measurement device such as a GNSS (or GPS) receiver 1106 and an imaging device such as a camera 1104. The optical survey instrument 1150 also includes a distance measuring device 1142 for determining a distance r between the optical survey instrument 1150 and a point of interest (not shown). The distance measuring device 1142 may be a conventional electronic distance measurement (EDM) device or may determine distance using known sonic measurement techniques. The optical survey instrument 1150 may also include an alignment unit 1154 such as a theodolite for aligning the optical survey instrument 1150 with a point of interest and determining an azimuth or angle of rotation about a vertical axis relative to a reference such as true north, magnetic north, or any other reference.

A pose of the camera 1104 may be determined using a controller (not shown) and known matchmove techniques as described above. For example, the pose may be determined using features in an image where the features are at known locations in a reference frame. The pose may also be determined using observed changes between common features in images where at least one of the images is acquired with the imaging device in a known (e.g., leveled) position. A tilt angle (theta) and a tilt direction (phi) may then be determined using known transformations and Equations (1)-(3) as described above. Equations (4)-(6) may be used to determine X and Y components of a ground error and a Z component of a height error in a manner similar to that illustrated in FIG. 24.

Determining Tilt Angle and Tilt Direction Using Image Processing

Figure 25:
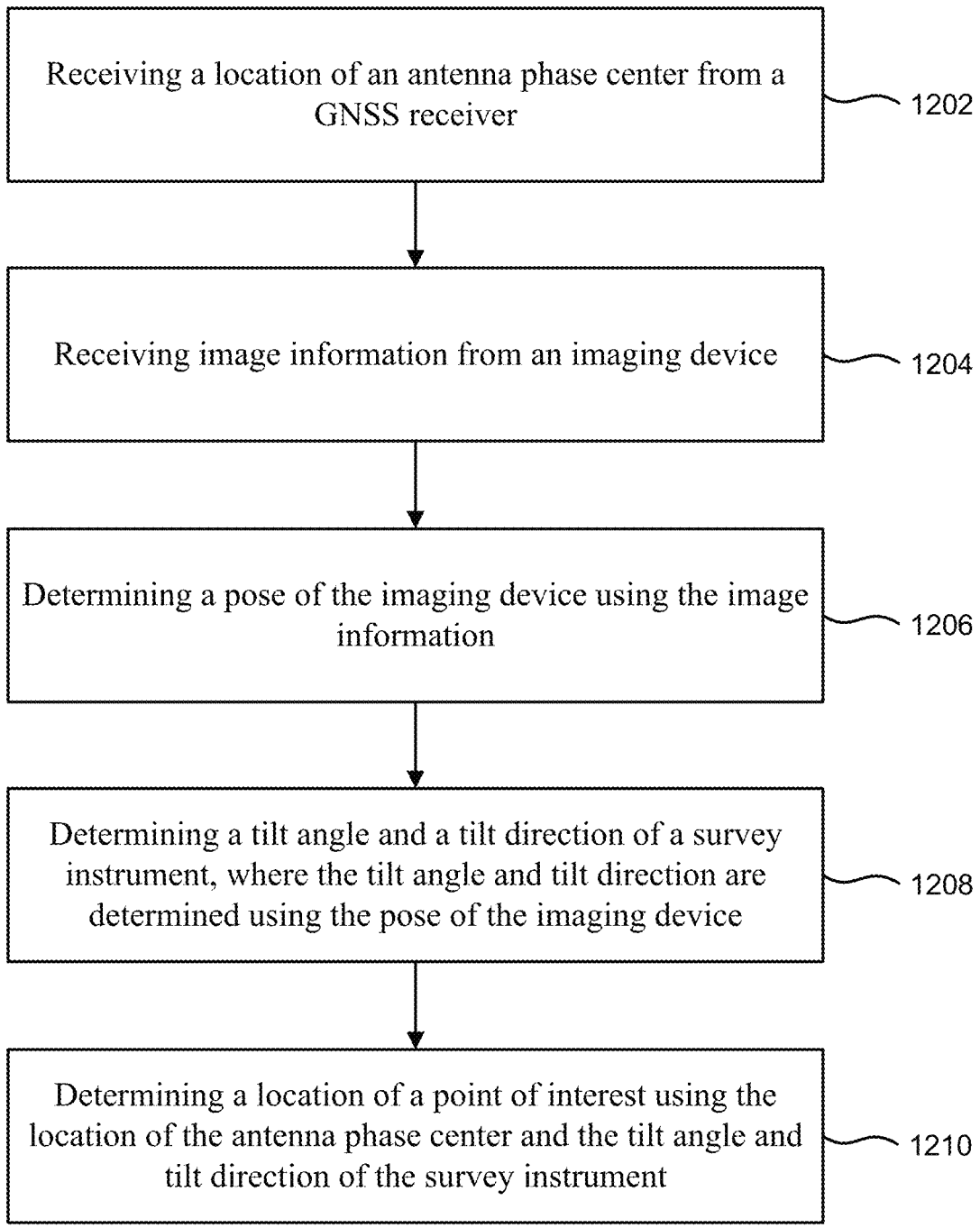
FIGS. 25-27 are flowcharts providing methods of determining a tilt angle and tilt direction and/or a location of a point of interest in accordance with some embodiments of the invention.

FIG. 25 is a flowchart providing a method of determining a location of a point of interest in accordance with an embodiment of the invention. The method includes receiving a location of an antenna phase center from a GNSS receiver (1202) and receiving image information from an imaging device (1204). The imaging device may be a digital camera, and the image information may include one or more images that include features from a scene surrounding the imaging device. In one embodiment, the features are at known locations in a reference frame such as a real-world coordinate system. In another embodiment, the features may include arbitrary points, lines, regions, contours, surfaces, areas of texture, and the like that can be detected in an image using known feature-identification processes.

The method also includes determining a pose of the imaging device using the image information (1206). The pose is determined using known matchmove techniques. The method also includes determining a tilt angle and a tilt direction of a survey instrument, where the tilt angle and tilt direction are determined using the pose of the imaging device (1208). The tilt angle and tilt direction can be determined from the pose using coordinate transforms. The method also includes determining a location of the point of interest using the location of the antenna phase center and the tilt angle and the tilt direction of the survey instrument (1210).

Figure 26:
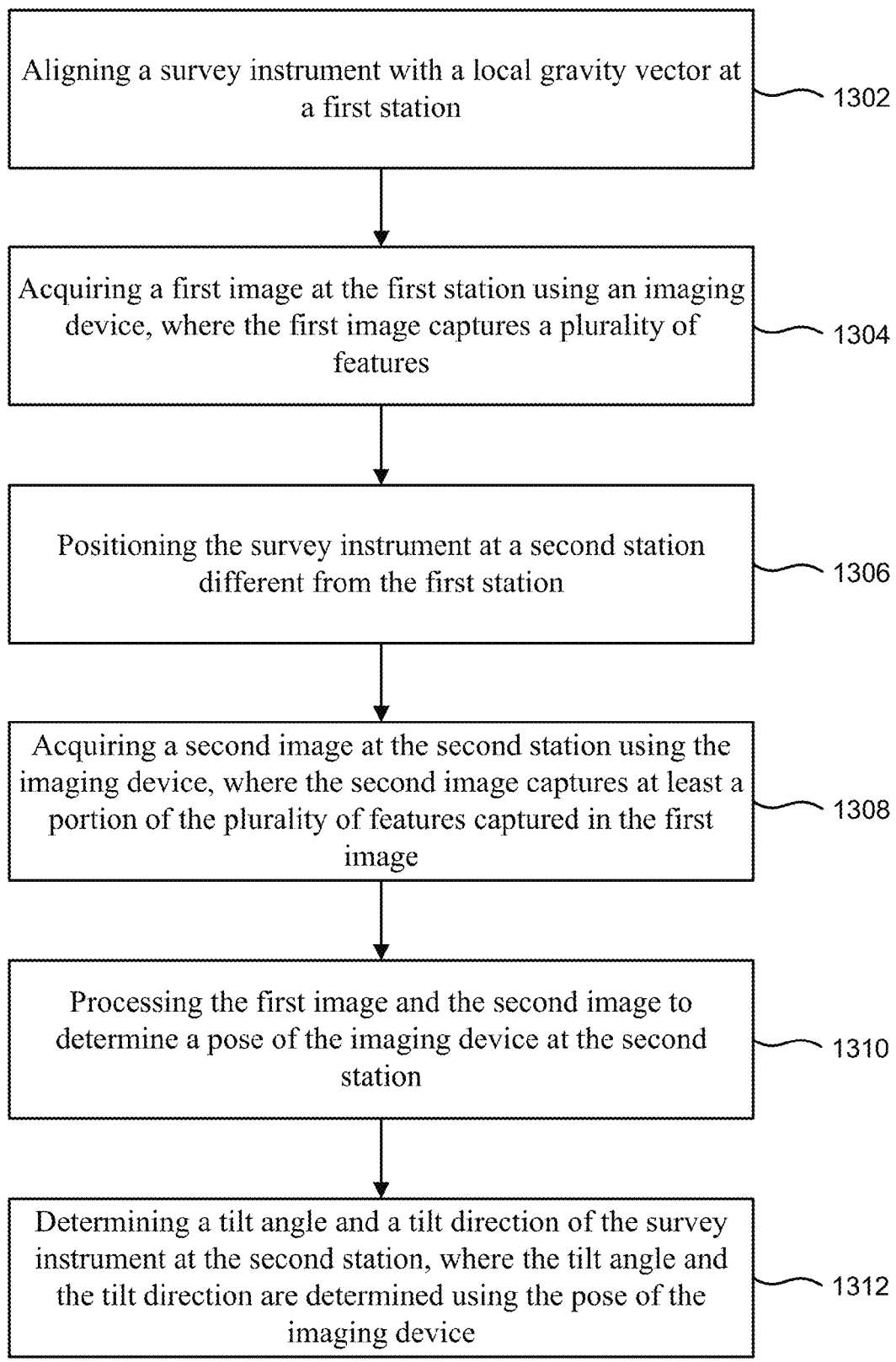

FIG. 26 is a flowchart providing a method of determining a tilt angle and tilt direction of a survey instrument in accordance with an embodiment of the invention. The method includes aligning the survey instrument with a local gravity vector at a first station (1302). The first station may be a measurement location from which a reference image is obtained (or a reference measurement station). The survey instrument may be aligned with the local gravity vector using a bubble level, tilt sensors, or other leveling techniques. It should be understood that the alignment is determined to within some accuracy that depends on the particular leveling technique. The method also includes acquiring a first image at the first station using an imaging device, where the first image captures a plurality of features (1304). The features may include arbitrary points, lines, regions, contours, surfaces, areas of texture, and the like that can be detected in an image using known feature-identification processes. The method also includes positioning the survey instrument at a second station different from the first station (1306) and acquiring a second image at the second station using the imaging device, where the second image captures at least a portion of the plurality of features captured in the first image (1308). It is not necessary for the survey instrument to be aligned with the local gravity vector at the second station. The method also includes processing the first image and the second image to determine a pose of the imaging device at the second station (1310). The images are processed using known matchmove techniques using observed changes between common features in the images. The method also includes determining the tilt angle and the tilt direction of the survey instrument at the second station, where the tilt angle and the tilt direction are determined using the pose of the imaging device (1312). The tilt angle and tilt direction can be determined from the pose using coordinate transforms.

Figure 27:
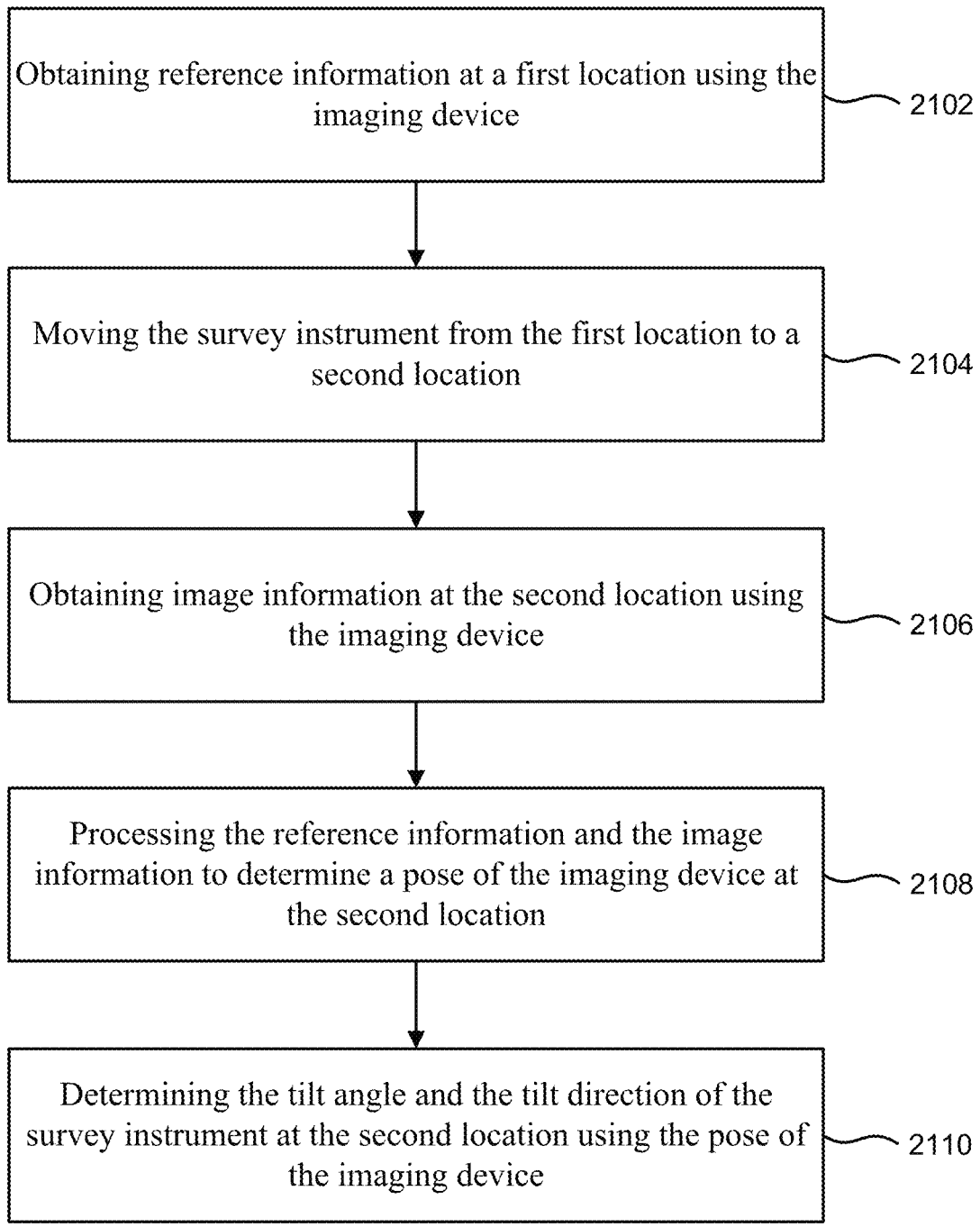

FIG. 27 is a flowchart providing a method of determining a tilt angle and a tilt direction of a survey instrument that includes an imaging device in accordance with some embodiments of the invention. The method includes obtaining reference information at a first location using the imaging device (2102). The imaging device may include one or more cameras arranged to capture images that include features from an environment around the survey instrument. In some embodiments, the reference information may include first images that include first features. In other embodiments, the reference information may include a first panoramic image that includes first features from the environment around the survey instrument. Additionally, the reference information may be obtained with the survey instrument substantially parallel to a local gravity vector, and/or the reference information may include features at known locations in a reference frame.

The method also includes moving the survey instrument from the first location to a second location (2104).

The method also includes obtaining image information at the second location using the imaging device (2106). In some embodiments, the image information may include second images that include a portion of the first features. In other embodiments, the image information may include a second panoramic image that includes a portion of the first features.

The method also includes processing the reference information and the image information to determine a pose of the imaging device at the second location (2108). In some embodiments, the pose may be determined using observed changes in location of the portion of the first features between the first images and the second images. In other embodiments, the pose may be determined using observed changes in location of the portion of the first features between the first panoramic image and the second panoramic image. In yet other embodiments, determining the pose of the imaging device includes determining poses of the imaging device based on each of the second images and corresponding ones of the first images and averaging the poses.

Processing the reference information and the image information may include assigning a weighting factor to each of the second images. The weighting factor may be associated with a relative contribution of each of the second images in determining the pose of the imaging device.

In some embodiments, processing the reference information and the image information may include determining a direction of travel of the survey instrument. The direction of travel may be determined by identifying a vertical plane of divergence in the second images. The vertical plane of divergence may be identified using the observed changes in location of the portion of the first features between the first images and the second images. The weighting factor assigned to each of the second images may depend on an orientation of a respective camera relative to the vertical plane of divergence. The second images that are nearest the vertical plane of divergence may be assigned larger weighting factors than those of the second images that are farthest from the vertical plane of divergence. If the vertical plane of divergence is aligned with one of the second images, the image aligned with the vertical plane of divergence may be assigned a larger weighting factor than others of the second images. If the vertical plane of divergence is between two of the second images, the two images nearest to the vertical plane of divergence may be assigned larger weighting factors than others of the second images.

The method also includes determining the tilt angle and the tilt direction of the survey instrument at the second location using the pose of the imaging device (2110). Some embodiments may also include determining coordinates of the survey instrument at the second location in a real-world coordinate frame using a GNSS receiver. The coordinates of a point of interest may be determined in the real-world coordinate frame using the coordinates of the survey instrument, the tilt angle, and the tilt direction.

Some embodiments may also include moving the survey instrument from the second location to one or more additional locations. At each of the one or more additional locations, additional image information may be obtained using the imaging device. The additional image information may include additional images that include features that are common with at least the first images, the second images, or additional images obtained at others of the one or more additional locations. For each of the one or more additional locations, the additional image information obtained at a particular location may be processed to determine a pose of the imaging device at the particular location.

In an embodiment, processing the additional image information includes assigning a weighting factor to each of the additional images. The weighting factor may be associated with a relative contribution of each of the additional images in determining the pose of the imaging device at the particular location. The tilt angle and the tilt direction of the survey instrument at the particular location may be determined using the pose of the imaging device at the particular location.

It should be appreciated that the specific steps illustrated in FIGS. 19-20 and 25-27 provide particular methods according to embodiments of the present invention. Other sequences of steps may also be performed according to alternative embodiments. For example, alternative embodiments may perform the steps outlined above in a different order. Moreover, the individual steps illustrated in FIGS. 19-20 and 25-27 may include multiple sub-steps that may be performed in various sequences. Furthermore, additional steps may be added or removed depending on the particular application.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method of determining a tilt angle and a tilt direction of a survey instrument that includes an imaging device, the method comprising:
at a first location, obtaining reference information using the imaging device, the imaging device including a plurality of cameras arranged to capture images that include features from an environment around the survey instrument, the reference information including first images that include first features;
moving the survey instrument from the first location to a second location;
at the second location, obtaining image information using the imaging device, the image information including second images that include a portion of the first features;
processing the reference information and the image information to determine a pose of the imaging device at the second location, the pose determined using observed changes in location of the portion of the first features between the first images and the second images, wherein processing the reference information and the image information includes assigning a weighting factor to each of the second images, the weighting factor associated with a relative contribution of each of the second images in determining the pose of the imaging device; and
determining the tilt angle and the tilt direction of the survey instrument at the second location using the pose of the imaging device.

2. The method of claim 1 further comprising:
at the second location, determining coordinates of the survey instrument in a real-world coordinate frame using a Global Navigation Satellite System (GNSS) receiver; and
determining coordinates of a point of interest in the real-world coordinate frame using the coordinates of the survey instrument, the tilt angle, and the tilt direction.

3. The method of claim 1 wherein processing the reference information and the image information includes determining a direction of travel of the survey instrument, the direction of travel determined by identifying a vertical plane of divergence in the second images, the vertical plane of divergence identified using the observed changes in location of the portion of the first features between the first images and the second images, wherein the weighting factor assigned to each of the second images depends on an orientation of a respective camera relative to the vertical plane of divergence.

4. The method of claim 3 wherein the vertical plane of divergence is aligned with one of the second images, and the image aligned with the vertical plane of divergence is assigned a larger weighting factor than others of the second images.

5. The method of claim 3 wherein the vertical plane of divergence is between two of the second images, and the two images nearest to the vertical plane of divergence are assigned larger weighting factors than others of the second images.

6. The method of claim 3 wherein those of the second images that are nearest the vertical plane of divergence are assigned larger weighting factors than those of the second images that are farthest from the vertical plane of divergence.

7. The method of claim 1 wherein the reference information is obtained with the survey instrument substantially parallel to a local gravity vector.

8. The method of claim 1 wherein the reference information includes features at known locations in a reference frame.

9. The method of claim 1 further comprising:
moving the survey instrument from the second location to one or more additional locations;
at each of the one or more additional locations, obtaining additional image information using the imaging device, the additional image information including additional images that include features that are common with at least the first images, the second images, or additional images obtained at others of the one or more additional locations;
for each of the one or more additional locations:
processing the additional image information obtained at a particular location of the one or more additional locations to determine a pose of the imaging device at the particular location, wherein processing the additional image information includes assigning a weighting factor to each of the additional images, the weighting factor associated with a relative contribution of each of the additional images in determining the pose of the imaging device at the particular location; and
determining the tilt angle and the tilt direction of the survey instrument at the particular location using the pose of the imaging device at the particular location.

10. The method of claim 9 wherein the additional image information is processed real-time using a sequential bundle adjustment technique.

11. A method of determining a tilt angle and a tilt direction of a survey instrument that includes an imaging device, the method comprising:
at a first location, obtaining reference information using the imaging device, the reference information including a first panoramic image that includes first features from the environment around the survey instrument;
moving the survey instrument from the first location to a second location;
at the second location, obtaining image information using the imaging device, the image information including a second panoramic image that includes a portion of the first features;
processing the reference information and the image information to determine a pose of the imaging device at the second location, the pose determined using observed changes in location of the portion of the first features between the first panoramic image and the second panoramic image; and
determining the tilt angle and the tilt direction of the survey instrument at the second location using the pose of the imaging device.

12. The method of claim 11 wherein the imaging device includes a plurality of cameras arranged to capture overlapping images that form a 360° panoramic view of an environment around the survey instrument.

13. The method of claim 11 wherein the imaging device includes a single camera arranged to capture a 360° panoramic view of an environment around the survey instrument.

14. The method of claim 11 further comprising:
at the second location, determining coordinates of the survey instrument in a real-world coordinate frame using a Global Navigation Satellite System (GNSS) receiver; and
determining coordinates of a point of interest in the real-world coordinate frame using the coordinates of the survey instrument, the tilt angle, and the tilt direction.

15. The method of claim 11 wherein the reference information is obtained with the survey instrument substantially parallel to a local gravity vector.

16. The method of claim 11 wherein the reference information includes features at known locations in a reference frame.

17. The method of claim 11 further comprising:
moving the survey instrument from the second location to one or more additional locations;
at each of the one or more additional locations, obtaining additional image information using the imaging device, the additional image information including additional panoramic images that include features that are common with at least the first panoramic image, the second panoramic image, or additional panoramic images obtained at others of the one or more additional locations;
for each of the one or more additional locations:
processing the additional image information obtained at a particular location of the one or more additional locations to determine a pose of the imaging device at the particular location; and
determining the tilt angle and the tilt direction of the survey instrument at the particular location using the pose of the imaging device at the particular location.

18. The method of claim 17 wherein the reference information and the image information are processed real-time using a sequential bundle adjustment technique.

19. A method of determining a tilt angle and a tilt direction of a survey instrument that includes an imaging device, the method comprising:
at a first location, obtaining reference information using the imaging device, the imaging device including a plurality of cameras arranged to capture images that include features from an environment around the survey instrument, the reference information including first images that include first features;
moving the survey instrument from the first location to a second location;
at the second location, obtaining image information using the imaging device, the image information including second images that include a portion of the first features;
processing the reference information and the image information to determine a pose of the imaging device at the second location, wherein determining the pose of the imaging device includes determining poses of the imaging device based on each of the second images and corresponding ones of the first images and averaging the poses; and
determining the tilt angle and the tilt direction of the survey instrument at the second location using the pose of the imaging device.

20. The method of claim 19 further comprising:
at the second location, determining coordinates of the survey instrument in a real-world coordinate frame using a Global Navigation Satellite System (GNSS) receiver; and
determining coordinates of a point of interest in the real-world coordinate frame using the coordinates of the survey instrument, the tilt angle, and the tilt direction.

21. The method of claim 19 wherein the reference information is obtained with the survey instrument substantially parallel to a local gravity vector.

22. The method of claim 19 wherein the reference information includes features at known locations in a reference frame.

23. The method of claim 19 wherein the reference information and the image information are processed real-time using a sequential bundle adjustment technique.

24. The method of claim 19 further comprising:
moving the survey instrument from the second location to one or more additional locations;
at each of the one or more additional locations, obtaining additional image information using the imaging device, the additional image information including additional images that include features that are common with at least the first images, the second images, or additional images obtained at others of the one or more additional locations;

for each of the one or more additional locations:
processing the additional image information obtained at a particular location of the one or more additional locations to determine a pose of the imaging device at the particular location, wherein determining the pose of the imaging device at the particular location includes determining poses of the imaging device based on each of the additional images at the particular location and averaging the poses; and
determining the tilt angle and the tilt direction of the survey instrument at the particular location using the pose of the imaging device at the particular location.

25. A method of determining a tilt angle and a tilt direction of a survey instrument, the method comprising:
at a first location, capturing first images that include features from an environment around the survey instrument;
at a second location, capturing second images that include a portion of the first features;
determine a pose of the imaging device at the second location using observed changes in location of the portion of the first features between the first images and the second images, wherein determining the pose includes assigning a weighting factor to each of the second images, the weighting factor associated with a relative contribution of each of the second images in determining the pose of the imaging device; and
determining the tilt angle and the tilt direction of the survey instrument at the second location using the pose of the imaging device.

26. The method of claim 25 further comprising:
identifying a plane of divergence in the second images;
determining an actual direction of travel of the survey instrument; and
associating the plane of divergence in the second images with the actual direction of travel.

27. A method of determining a tilt angle and a tilt direction of a survey instrument, the method comprising:
at a first location, capturing a first panoramic image that includes first features from the environment around the survey instrument;
at a second location, capturing a second panoramic image that includes a portion of the first features;
determining a pose of the imaging device at the second location using observed changes in location of the portion of the first features between the first panoramic image and the second panoramic image; and
determining the tilt angle and the tilt direction of the survey instrument at the second location using the pose of the imaging device.

* * * * *